(12) United States Patent
Li et al.

(10) Patent No.: US 12,520,129 B2
(45) Date of Patent: Jan. 6, 2026

(54) METHOD FOR TRANSMITTING USER TERMINAL CAPABILITY INFORMATION AND RELATED APPARATUS

(71) Applicant: HUAWEI TECHNOLOGIES CO., LTD., Guangdong (CN)

(72) Inventors: Bingzhao Li, Beijing (CN); Bin Xu, Beijing (CN); Lei Chen, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 463 days.

(21) Appl. No.: 17/205,783

(22) Filed: Mar. 18, 2021

(65) Prior Publication Data

US 2021/0211865 A1    Jul. 8, 2021

Related U.S. Application Data

(63) Continuation of application No. PCT/CN2019/106118, filed on Sep. 17, 2019.

(30) Foreign Application Priority Data

Sep. 21, 2018    (CN) .......................... 201811108636.2

(51) Int. Cl.
 *H04W 8/24*     (2009.01)
 *H04W 4/12*     (2009.01)
 (Continued)

(52) U.S. Cl.
 CPC ............... *H04W 8/24* (2013.01); *H04W 4/12* (2013.01); *H04W 24/04* (2013.01); *H04W 76/27* (2018.02)

(58) Field of Classification Search
 CPC ....... H04L 69/04; H04L 5/001; H04L 5/0053; H04W 8/24; H04W 4/12; H04W 24/04; H04W 76/27; Y02D 30/70
 See application file for complete search history.

(56) References Cited

U.S. PATENT DOCUMENTS

2015/0172959 A1    6/2015   Cucala Garcia et al.
2015/0264637 A1*   9/2015   Zaus ....................... H04W 8/20
                                                        455/434

(Continued)

FOREIGN PATENT DOCUMENTS

CN         101039504 A      9/2007
CN         102860108 A      1/2013

(Continued)

OTHER PUBLICATIONS

Office Action in Chinese Appln. No. 201811108636.2, dated Apr. 13, 2023, 13 pages.

(Continued)

*Primary Examiner* — Congvan Tran
(74) *Attorney, Agent, or Firm* — Fish & Richardson P.C.

(57) ABSTRACT

Example methods and apparatus for transmitting user equipment capability information are provided. One example method includes receiving a plurality of first response messages by an access network device from a user terminal after sending a first request message to the user terminal, where each of the first response messages includes a subset of a UE capability information set. The access network device decodes the first response message to obtain a UE capability.

28 Claims, 10 Drawing Sheets

(51) Int. Cl.
*H04W 24/04* (2009.01)
*H04W 76/27* (2018.01)

(56) References Cited

U.S. PATENT DOCUMENTS

| | | | | |
|---|---|---|---|---|
| 2015/0304838 | A1* | 10/2015 | Kanamarlapudi | H04W 8/24 455/422.1 |
| 2017/0215065 | A1* | 7/2017 | Vamanan | H04W 8/22 |
| 2017/0265190 | A1* | 9/2017 | Marjelund | H04W 72/21 |
| 2017/0367073 | A1 | 12/2017 | Murugan et al. | |
| 2018/0034616 | A1* | 2/2018 | Shen | H04L 5/0058 |
| 2018/0084539 | A1* | 3/2018 | Kubota | H04W 72/51 |
| 2018/0206113 | A1* | 7/2018 | He | H04W 8/24 |
| 2018/0220295 | A1* | 8/2018 | Takahashi | H04W 72/20 |
| 2018/0262905 | A1 | 9/2018 | Dhanapal et al. | |
| 2019/0090126 | A1* | 3/2019 | Hayashi | H04W 74/02 |
| 2019/0104432 | A1* | 4/2019 | Dhanapal | H04W 76/50 |
| 2019/0110190 | A1* | 4/2019 | Van Lieshout | H04W 76/27 |
| 2019/0350027 | A1* | 11/2019 | Centonza | H04W 76/16 |
| 2020/0260264 | A1* | 8/2020 | Hapsari | H04W 88/06 |
| 2022/0217583 | A1* | 7/2022 | Jin | H04W 8/24 |

FOREIGN PATENT DOCUMENTS

| | | |
|---|---|---|
| CN | 103188745 A | 7/2013 |
| CN | 103270787 A | 8/2013 |
| CN | 105915323 A | 8/2016 |
| CN | 106031205 A | 10/2016 |
| CN | 107251606 A | 10/2017 |
| CN | 107925870 A | 4/2018 |
| EP | 2326061 B1 | 2/2013 |
| WO | 2009059477 A1 | 5/2009 |
| WO | 2017154618 A1 | 9/2017 |
| WO | 2018039974 A1 | 3/2018 |

OTHER PUBLICATIONS

Office Action issued in Chinese Application No. 202011550274.X on Sep. 18, 2021, 17 pages (with English translation).
Office Action issued in Chinese Application No. 202210679190.9 on Nov. 8, 2022, 10 pages.
Extended European Search Report issued in European Application No. 19863096.4 on Oct. 29, 2021, 9 pages.
3GPP TS 38.331 V15.2.1 (Jun. 2018), "3rd Generation Partnership Project; Technical Specification Group Radio Access Network; NR; Radio Resource Control (RRC) protocol specification (Release 15)," Jun. 2018, 303 pages.
MediaTek Inc., "UE Capability ID—Motivation," 3GPP TSG RAN Meeting#80, RP-181151, La Jolla, CA, USA, Jun. 11-13, 2018, 3 pages.
PCT International Search Report and Written Opinion issued in International Application No. PCT/CN2019/106118 on Nov. 15, 2019, 15 pages (with English translation).

* cited by examiner

METHOD FOR TRANSMITTING USER TERMINAL CAPABILITY INFORMATION AND RELATED APPARATUS

CROSS-REFERENCE TO RELATED APPLICATIONS

This application is a continuation of International Application No. PCT/CN2019/106118, filed on Sep. 17, 2019, which claims priority to Chinese Patent Application No. 201811108636.2, filed on Sep. 21, 2018. The disclosures of the aforementioned applications are hereby incorporated by reference in their entireties.

TECHNICAL FIELD

This application relates to the field of wireless communications technologies, and in particular, to a method for transmitting user terminal capability information and a related apparatus.

BACKGROUND

Benefiting from rapid development of an integrated circuit technology, a battery technology, and a wireless communications technology, a processing capability of a wireless communications terminal has been greatly improved. Currently, a more complex application program can be run on a wireless communications terminal, and the wireless communications terminal supports not only a longer standby time but also a mobile communications standard with stronger performance and higher complexity. For example, in terms of wireless communication performance, currently, the wireless communications terminal usually supports more antennas, a higher-order modulation scheme (Modulation and Coding Scheme, MCS), and a more complex multiplexing technology. In this case, informing a network of a processing capability of the wireless communications terminal can undoubtedly help the network provide a better service for the wireless communications terminal.

Different user terminals, including but not limited to, for example, user equipment (UE), support different capabilities due to different hardware or software versions. To provide a better service for the UE, the network needs to learn of a capability of the UE, thereby configuring an appropriate working mode for the UE. However, as capabilities supported by the UE become increasingly strong, capability information that needs to be reported becomes increasingly large, and may reach 65 kbit or more. However, currently, a maximum radio resource control (RRC) message that can be transmitted over an air interface is 9 kbit.

Currently, capability information obtained after encoding may be divided, through splitting, into a plurality of segments for sending and reporting. However, a receive end needs to receive and splice all the segments, and then perform decoding to obtain the capability information. This process is not flexible enough, and higher requirements are imposed on a report delay of the capability information and reliability.

SUMMARY

This application provides a method for transmitting user terminal capability information and a related apparatus, to effectively resolve a problem that excessively large user terminal capability information cannot be reported at one time, and effectively reduce a report delay of the user terminal capability information, thereby improving reliability.

According to a first aspect, a method for transmitting user terminal capability information is provided. The method includes: sending, by an access network device, a first request message to a user terminal; receiving, by the access network device, a plurality of first response messages sent by the user terminal in response to the first request message, where each of the first response messages includes a subset of a user terminal capability information set; and decoding, by the access network device, one or more of the first response messages to obtain a user terminal capability.

The access network device sends the first request message to the user terminal only when a core network device does not store user terminal capability information of the related user terminal. Specifically, the access network device may send a user terminal capability information enquiry message to the user terminal, to notify the user terminal to report the user terminal capability information.

In the solution provided in this application, the user terminal sends the plurality of response messages to the access network device based on the first request message, and each of the response messages includes the subset of the user terminal capability information set. The access network device decodes the one or more of the response messages to obtain the user terminal capability. In this way, it can be ensured that each response message received by the access network device carries a part of user terminal capabilities, and can be separately encoded and decoded. Therefore, the solution provided in this application can effectively resolve a problem that excessively large user terminal capability information cannot be reported at one time, and effectively reduce a report delay of the user terminal capability information, thereby improving reliability.

It may be understood that the user terminal capability information includes but is not limited to UE capability information and user capability information.

With reference to the first aspect, in a possible implementation of the first aspect, the capability information set includes at least one of the following: a band combination, a feature set, or a non-carrier aggregation capability that are supported by the user terminal.

Specifically, the user terminal capabilities include a carrier aggregation capability and the non-carrier aggregation capability, and the carrier aggregation capability includes a plurality of band combinations.

Specific capability information for a band combination in the feature set may be cited to the band combination.

In the solution provided in this application, the user terminal sends, to the access network device, the band combination, the feature set, or the non-carrier aggregation capability supported by the user terminal and a combination thereof, to ensure that the access network device can receive the complete user terminal capability information, thereby facilitating proper configuration performed for the user terminal.

With reference to the first aspect, in a possible implementation of the first aspect, the first request message includes at least one of the following: first indication information, where the first indication information is used to indicate that the user terminal is allowed to send the plurality of first response messages; first priority information, where the first priority information is used to indicate a band combination that is to be preferentially reported; or a first value, where the first value is used to indicate a maximum value of a size of each of the first response messages allowed to be sent by the user terminal.

The first priority information may be band information, a subcarrier spacing, a MIMO capability, a quantity of aggregated carriers, a carrier aggregation bandwidth, or the like.

In the solution provided in this application, the access network device may set, based on an actual requirement, the response messages that are to be sent by the user terminal, and notify the user terminal by using the first request message of, for example, whether the user terminal is allowed to send the plurality of response messages, a size of each response message, and the band combination that needs to be preferentially reported in the response message.

With reference to the first aspect, in a possible implementation of the first aspect, the $1^{st}$ first response message received by the access network device includes at least one of the following:

a second value, where the second value is a value of a quantity of first response messages that need to be sent by the user terminal; a first band combination, where a quantity of uplink carriers or a quantity of downlink carriers in the first band combination is less than or equal to a first threshold, and the first threshold is preset by the user terminal or is configured by the access network device; a second band combination, where an uplink carrier aggregation bandwidth or a downlink carrier aggregation bandwidth in the second band combination is less than or equal to a second threshold, and the second threshold is preset by the user terminal or is configured by the access network device; a first capability combination, where the first capability combination includes a non-carrier aggregation capability; or a feature set supported by the user terminal.

In the solution provided in this application, the user terminal may send, in advance to the access network device (for example, by using the 1st response message), necessary configuration information or a part of the UE capability information, for example, the second value (that is, a total quantity of response messages that need to be sent by the user terminal), the first band combination, the second band combination, the first capability combination (namely, a single-carrier capability), or the feature set, so that the access network device can complete pre-configuration for the user terminal, and the user terminal can perform data transmission.

With reference to the first aspect, in a possible implementation of the first aspect, the last first response message received by the access network device includes second indication information, and the second indication information is used to indicate that the user terminal has completed report of the UE capability information set.

In the solution provided in this application, the access network device may determine, based on the second indication information, whether the user terminal has completed the report of the user terminal capability information. After determining that the user terminal has completed the report of the user terminal capability information, the access network device may release a connection resource in time, thereby improving resource utilization.

In an implementation, after receiving at least one response message, the access network device obtains a part of the user terminal capabilities through decoding; and may perform configuration for the user terminal based on the obtained part of the capabilities, and simultaneously receive another response message sent by the user terminal.

With reference to the first aspect, in a possible implementation of the first aspect, the method further includes: sending, by the access network device, third indication information to the user terminal, so that the user terminal stops, in response to the third indication information, sending a first response message that has not been sent.

The third indication information includes a third value, and the third value is used to indicate an $n^{th}$ first response message, so that after completing sending of the $n^{th}$ first response message, the user terminal stops sending the first response message that has not been sent, where n is a positive integer greater than or equal to 1.

In the solution provided in this application, in or before a process of receiving the plurality of response messages sent by the user terminal, the access network device may send the third indication information to the user terminal, to notify the user terminal to stop sending a remaining response message or notify the user terminal to stop, based on the third value, sending a remaining response message. In this way, a transmission resource between the access network device and the user terminal can be released in advance, thereby improving utilization of the transmission resource between the access network device and the user terminal.

With reference to the first aspect, in a possible implementation of the first aspect, the first response message further includes a subset of a feature set, the subset of the feature set includes fourth indication information, and the fourth indication information is used to indicate a location number, in the feature set, of the 1st element in the subset.

In the solution provided in this application, the user terminal includes the subset of the feature set in the response message to be sent to the access network device, and adds the fourth indication information to the subset. In this way, the access network device can determine a location sequence number, in the feature set, of each element in the subset based on the fourth indication information, and can correctly cite capability information in the subset to obtain the correct user terminal capability.

With reference to the first aspect, in a possible implementation of the first aspect, when the first response message includes the subset of the feature set, the decoding the first response message to obtain a user terminal capability includes: decoding the first response message to obtain the subset of the user terminal capability information set and the subset of the feature set, and obtaining the user terminal capability based on the subset of the user terminal capability information set and the subset of the feature set.

In the solution provided in this application, when the received response message includes the subset of the user terminal capability information set and the subset of the feature set, the access network device needs to decode the response message to separately obtain the subset of the user terminal capability information set and the subset of the feature set. In this way, it can be ensured that the capability information in the subset of the feature set can be cited to the band combination in the subset of the user terminal capability information set, to finally obtain the complete and correct user terminal capabilities.

With reference to the first aspect, in a possible implementation of the first aspect, after the receiving, by the access network device, a plurality of first response messages sent by the user terminal, the method further includes: sending a plurality of first messages to the core network device, where each of the first messages includes a subset of the user terminal capability information set.

In the solution provided in this application, after receiving the plurality of response messages sent by the user terminal, the access network device stores the user terminal capability information included in the plurality of response messages, and sends the user terminal capability information to the core network device by using a plurality of messages (namely, the first messages). Each of the messages includes the subset of the user terminal capability information set, so that the core network device stores the received user terminal capability information. In this way, if subsequently needing to use the user terminal capability information, the access network device may directly obtain the user terminal capability information from the core network device, and the user terminal does not need to report the user terminal capability information, thereby saving an air interface resource and improving efficiency of obtaining the UE capability information.

According to a second aspect, a method for transmitting user terminal capability information is provided. The method includes: receiving, by a user terminal, a first request message sent by an access network device; and sending, by the user terminal, a plurality of first response messages to the access network device in response to the first request message, where each of the first response messages includes a subset of a user terminal capability information set.

In the solution provided in this application, the user terminal sends the plurality of response messages to the access network device based on the first request message, and each of the response messages includes the subset of the user terminal capability information set. The access network device decodes one or more of the response messages to obtain a user terminal capability. In this way, it can be ensured that each response message sent by the user terminal carries a part of user terminal capabilities, and can be separately encoded and decoded. Therefore, the solution provided in this application can effectively resolve a problem that excessively large user terminal capability information cannot be reported at one time, and effectively reduce a report delay of the user terminal capability information, thereby improving reliability.

With reference to the second aspect, in a possible implementation of the second aspect, the capability information set includes at least one of the following: a band combination, a feature set, or a non-carrier aggregation capability that are supported by the user terminal.

With reference to the second aspect, in a possible implementation of the second aspect, the first request message includes at least one of the following: first indication information, where the first indication information is used to indicate that the user terminal is allowed to send the plurality of first response messages, and the user terminal determines, based on the first indication information, whether the plurality of first response messages can be sent; first priority information, where the first priority information is used to indicate a band combination that is to be preferentially reported, and the user terminal determines, based on the first priority information, the band combination that is to be preferentially reported; or a first value, where the first value is used to indicate a maximum value of a size of each of the first response messages allowed to be sent by the user terminal, and the user terminal determines, based on the first value, the maximum value of a size of the to-be-generated first response message.

The first priority information may be band information, a subcarrier spacing, a MIMO capability, a quantity of aggregated carriers, a carrier aggregation bandwidth, or the like.

With reference to the second aspect, in a possible implementation of the second aspect, the $1^{st}$ first response message sent by the user terminal includes at least one of the following:

a second value, where the second value is a value of a quantity of first response messages that need to be sent by the user terminal; a first band combination, where a quantity of uplink carriers or a quantity of downlink carriers in the first band combination is less than or equal to a first threshold, and the first threshold is preset by the user terminal or is configured by the access network device; a second band combination, where an uplink carrier aggregation bandwidth or a downlink carrier aggregation bandwidth in the second band combination is less than or equal to a second threshold, and the second threshold is preset by the user terminal or is configured by the access network device; a first capability combination, where the first capability combination includes a non-carrier aggregation capability; or a feature set supported by the user terminal.

With reference to the second aspect, in a possible implementation of the second aspect, the last first response message sent by the user terminal includes second indication information, and the second indication information is used to indicate that the user terminal has completed report of the user terminal capability information set.

With reference to the second aspect, in a possible implementation of the second aspect, the method further includes: receiving, by the user terminal, third indication information sent by the access network device, and stopping, in response to the third indication information, sending a first response message.

The third indication information includes a third value, the third value is used to indicate an $n^{th}$ first response message, and after completing sending of the $n^{th}$ first response message, the user terminal stops sending the first response message that has not been sent, where n is a positive integer greater than or equal to 1.

With reference to the second aspect, in a possible implementation of the second aspect, the first response message further includes a subset of a feature set, the subset of the feature set includes fourth indication information, and the fourth indication information is used to indicate a location number, in the feature set, of the 1st element in the subset.

According to a third aspect, a method for transmitting user terminal capability information is provided. The method includes: receiving, by a core network device, a plurality of first messages sent by an access network device, where each of the first messages includes a subset of a user terminal capability information set; and storing, by the core network device, the plurality of first messages.

In the solution provided in this application, after receiving a plurality of response messages sent by a user terminal, the access network device stores user terminal capability information included in the plurality of response messages, and sends the user terminal capability information to the core network device by using a plurality of messages (namely, the first messages). Each of the messages includes the subset of the user terminal capability information set. The core network device receives the plurality of messages sent by the access network device, and stores the user terminal capability information included in the plurality of messages. In this way, if subsequently needing to use the user terminal capability information, the access network device may directly obtain the user terminal capability information from the core network device, and the user terminal does not need to report the user terminal capability information, thereby saving an air interface resource and improving efficiency of obtaining the user terminal capability information.

With reference to the third aspect, in a possible implementation of the third aspect, the first message includes at least one of the following: first identification information, where the first identification information is used to identify a sequence number of the first message; or first indication information, where the first indication information is used to indicate whether the access network device has completed report of the user terminal capability information set.

In the solution provided in this application, the access network device includes the first identification information and/or the first indication information in the sent first message, so that the core network device can identify the sequence number of each message sent by the access network device and whether the access network device has completed sending of the user terminal capability information, to ensure that the received messages are in order, and avoid repeated receiving.

According to a fourth aspect, an access network device is provided, and is applied to a network side. The access network device may be a base station or an access point, or may be a chip in a base station or an access point. The access network device has a function of implementing behavior of the access network device in the first aspect. The function may be implemented by hardware, or may be implemented by hardware executing corresponding software. The hardware or software includes one or more units corresponding to the foregoing function.

In a possible design, the access network device includes a processing module and a transceiver module. The processing module may be, for example, a processor. The transceiver module may be, for example, a transceiver. The transceiver may include a radio frequency circuit and a baseband circuit. The transceiver module is configured to support communication between the access network device and a user terminal and communication between the access network device and a core network device. In an example, the transceiver module may further include a sending module and a receiving module, to support the access network device in performing uplink communication and downlink communication. For example, the sending module may be configured to send a first request message to the user terminal. The receiving module may be configured to receive a plurality of first response messages sent by the user terminal (for example, a smartphone) in response to the first request message, where each of the first response messages includes a subset of a user terminal capability information set. The processing module may be configured to decode one or more of the first response messages to obtain a user terminal capability. Optionally, the access network device may further include a memory. The memory is configured to couple to the processor, and stores a program instruction and data that are necessary for the access network device.

In another possible design, the access network device includes a processor, a baseband circuit, a radio frequency circuit, and an antenna. The processor is configured to control functions of the circuits. The baseband circuit, the radio frequency circuit, and the antenna are configured to support communication between the access network device and a user terminal and communication between the access network device and a core network device. For example, in uplink communication, the radio frequency circuit of the access network device may perform processing such as digital conversion, filtering, amplification, and down-conversion on a plurality of first response messages that are sent by the user terminal and that are received via the antenna, and then the baseband circuit performs decoding and protocol-based decapsulation, to obtain user terminal capability information. Optionally, the access network device further includes a memory, and the memory stores a program instruction and data that are necessary for the access network device. For example, in downlink communication, the baseband circuit of the access network device generates a first request message that carries a user terminal capability information enquiry, the radio frequency circuit performs processing such as analog conversion, filtering, amplification, and up-conversion on the first request message, and then the first request message is sent to the user terminal via the antenna.

In still another possible design, the access network device includes a processor and a modem. The processor may be configured to run an instruction or an operating system, to control a function of the access network device. The modem may perform processing such as protocol-based encapsulation, encoding, decoding, modulation, demodulation, and equalization on data to generate a first request message carrying a user terminal capability information enquiry, to support the access network device in performing a corresponding function in the first aspect. The modem may further be configured to receive a plurality of first response messages sent by a user terminal, to decode one or more of the first response messages to obtain a user terminal capability.

In yet another possible design, when the access network device is a chip in a base station or an access point, the chip includes a processing module and a transceiver module. The processing module may be, for example, a processor. The processor may be configured to perform processing such as filtering, demodulation, power amplification, and decoding on a data packet that is received by using the transceiver module and that carries a first response message. The transceiver module may be, for example, an input/output interface, a pin, or a circuit on the chip. The processing module may execute a computer-executable instruction stored in a storage unit, to support the access network device in performing a corresponding function in the first aspect. Optionally, the storage unit may be a storage unit in the chip, for example, a register or a buffer. Alternatively, the storage unit may be a storage unit that is in the access network device and that is located outside the chip, for example, a read-only memory (ROM for short) or another type of static storage device that can store static information and instructions, or a random access memory (RAM for short).

In still yet another possible implementation, the access network device includes a processor. The processor is configured to: couple to a memory, read an instruction in the memory, and perform, according to the instruction, a function of the access network device in the first aspect. The memory may be located inside the processor, or may be located outside the processor.

According to a fifth aspect, a user terminal is provided. The user terminal may be user equipment (UE), or may be a chip in user equipment. The user terminal has a function of implementing behavior of the user terminal in the second aspect. The function may be implemented by hardware, or may be implemented by hardware executing corresponding software. The hardware or software includes one or more units corresponding to the foregoing function.

In a possible design, when the user terminal is UE, the user terminal includes a processing module and a transceiver module. The processing module may be, for example, a processor. The transceiver module may be, for example, a transceiver. The transceiver may include a radio frequency circuit and a baseband circuit. The transceiver module is configured to support communication between the user terminal and an access network device or communication between the user terminal and another user terminal. In an example, the transceiver module may further include a sending module and a receiving module. For example, the receiving module is configured to receive a first request message sent by the access network device. The sending module is configured to send a plurality of first response messages to the access network device. The processing module is configured to generate the plurality of first response messages based on the first request message, where each of the first response messages includes a subset of a user terminal capability information set. Optionally, the user terminal may further include a memory. The memory is configured to couple to the processor, and stores a program instruction and data that are necessary for the user terminal.

In another possible design, the user terminal includes a processor, a baseband circuit, a radio frequency circuit, and an antenna. The processor is configured to control functions of the circuits. The baseband circuit, the radio frequency circuit, and the antenna are configured to support communication between the user terminal and an access network device. For example, in downlink communication, the radio frequency circuit may perform processing such as digital conversion, filtering, amplification, and down-conversion on a first request messages that is sent by the access network device and that is received via the antenna, and then the baseband circuit performs decoding and protocol-based decapsulation, to obtain a user terminal capability information enquiry message. Optionally, the user terminal further includes a memory, and the memory stores a program instruction and data that are necessary for the user terminal. In uplink communication, the baseband circuit generates a plurality of first response messages each carrying a subset of a user terminal capability information set, the radio frequency circuit performs processing such as analog conversion, filtering, amplification, and up-conversion on the plurality of first response messages, and then the plurality of first response messages are sent to the access network device via the antenna.

In still another possible implementation, the user terminal includes a processor and a modem. The processor may be configured to run an instruction or an operating system, to control a function of the user terminal. The modem may perform processing such as protocol-based encapsulation, encoding, decoding, modulation, demodulation, and equalization on data to generate a plurality of first response messages each carrying a subset of a user terminal capability information set, to support the user terminal in performing a corresponding function in the second aspect. The modem may further be configured to receive a first request message sent by an access network device, to generate the plurality of first response messages based on the first request message.

In yet another possible implementation, when the user terminal is a chip in user equipment UE, the chip includes a processing module and a transceiver module. The processing module may be, for example, a processor. The processor may be configured to perform processing such as filtering, demodulation, power amplification, and decoding on a data packet that is received by using the transceiver module and that carries a first request message. The transceiver module may be, for example, an input/output interface, a pin, or a circuit on the chip. The processing module may execute a computer-executable instruction stored in a storage unit, to support the user terminal in performing a corresponding function in the second aspect. Optionally, the storage unit may be a storage unit in the chip, for example, a register or a buffer. Alternatively, the storage unit may be a storage unit that is in the user terminal and that is located outside the chip, for example, a read-only memory (ROM for short) or another type of static storage device that can store static information and instructions, or a random access memory (RAM for short).

In still yet another possible implementation, the user terminal includes a processor. The processor is configured to: couple to a memory, read an instruction in the memory, and perform, according to the instruction, a function of the user terminal in the second aspect. The memory may be located inside the processor, or may be located outside the processor.

According to a sixth aspect, a core network device is provided. The core network device may be a mobility management entity MME, or may be a chip in an MME. The core network device has a function of implementing behavior of the core network device in the third aspect. The function may be implemented by hardware, or may be implemented by hardware executing corresponding software. The hardware or software includes one or more units corresponding to the foregoing function.

In a possible design, the core network device includes a processing module and a transceiver module. The processing module may be, for example, a processor. The transceiver module may be, for example, a transceiver. The transceiver may include a radio frequency circuit and a baseband circuit. The transceiver module is configured to support communication between the core network device and an access network device. In an example, the transceiver module may further include a sending module and a receiving module, to support the core network device in performing uplink communication and downlink communication. For example, the receiving module may be configured to receive a plurality of first messages sent by the access network device, where each of the first messages includes a subset of a user terminal capability information set. The processing module may be configured to store the plurality of first messages. Optionally, the core network device may further include a memory. The memory is configured to couple to the processor, and stores a program instruction and data that are necessary for the core network device.

In another possible design, the core network device includes a processor, a baseband circuit, a radio frequency circuit, and an antenna. The processor is configured to control functions of the circuits. The baseband circuit, the radio frequency circuit, and the antenna are configured to support communication between the core network device and an access network device. For example, in uplink communication, the radio frequency circuit of the core network device may perform processing such as digital conversion, filtering, amplification, and down-conversion on a plurality of first messages that are sent by the access network device and that are received via the antenna, and then the baseband circuit performs decoding and protocol-based decapsulation, to obtain user terminal capability information. Optionally, the core network device further includes a memory, and the memory stores a program instruction and data that are necessary for the core network device. For example, in downlink communication, the baseband circuit of the core network device generates a UE context setup request message, the radio frequency circuit performs processing such as analog conversion, filtering, amplification, and up-conversion on the UE context setup request message, and then the UE context setup request message is sent to the access network device via the antenna.

In still another possible design, the core network device includes a processor and a modem. The processor may be configured to run an instruction or an operating system, to control a function of the core network device. The modem may perform processing such as protocol-based encapsulation, encoding, decoding, modulation, demodulation, and equalization on data to generate a UE context setup request message, to support the core network device in performing a corresponding function in the third aspect. The modem may further be configured to receive a plurality of first messages sent by an access network device, to store user terminal capability information carried in the plurality of first messages.

In yet another possible design, when the core network device is a chip in an MME, the chip includes a processing module and a transceiver module. The processing module may be, for example, a processor. The processor may be configured to perform processing such as filtering, demodulation, power amplification, and decoding on a data packet that is received by using the transceiver module and that carries a first message. The transceiver module may be, for example, an input/output interface, a pin, or a circuit on the chip. The processing module may execute a computer-executable instruction stored in a storage unit, to support the core network device in performing a corresponding function in the third aspect. Optionally, the storage unit may be a storage unit in the chip, for example, a register or a buffer. Alternatively, the storage unit may be a storage unit that is in the core network device and that is located outside the chip, for example, a read-only memory (ROM for short) or another type of static storage device that can store static information and instructions, or a random access memory (RAM for short).

In still yet another possible implementation, the core network device includes a processor. The processor is configured to: couple to a memory, read an instruction in the memory, and perform, according to the instruction, a function of the core network device in the third aspect. The memory may be located inside the processor, or may be located outside the processor.

According to a seventh aspect, this application provides a computer-readable storage medium. The computer-readable storage medium stores a computer program. When the program is executed by a processor, the method according to any one of the first aspect or the possible implementations of the first aspect is implemented.

According to an eighth aspect, this application provides a computer-readable storage medium. The computer-readable storage medium stores a computer program. When the program is executed by a processor, the method according to any one of the second aspect or the possible implementations of the second aspect is implemented.

According to a ninth aspect, this application provides a computer-readable storage medium. The computer-readable storage medium stores a computer program. When the program is executed by a processor, the method according to any one of the third aspect or the possible implementations of the third aspect is implemented.

According to a tenth aspect, a computer program product including an instruction is provided. When the computer program product is run on a computer, the computer is enabled to perform the method according to any one of the first to the third aspects or the possible implementations of the first to the third aspects. All or a part of the computer program product may be stored in a storage medium encapsulated in a processor, or may be stored in a storage medium encapsulated outside a processor.

DESCRIPTION OF EMBODIMENTS

Figure 1:
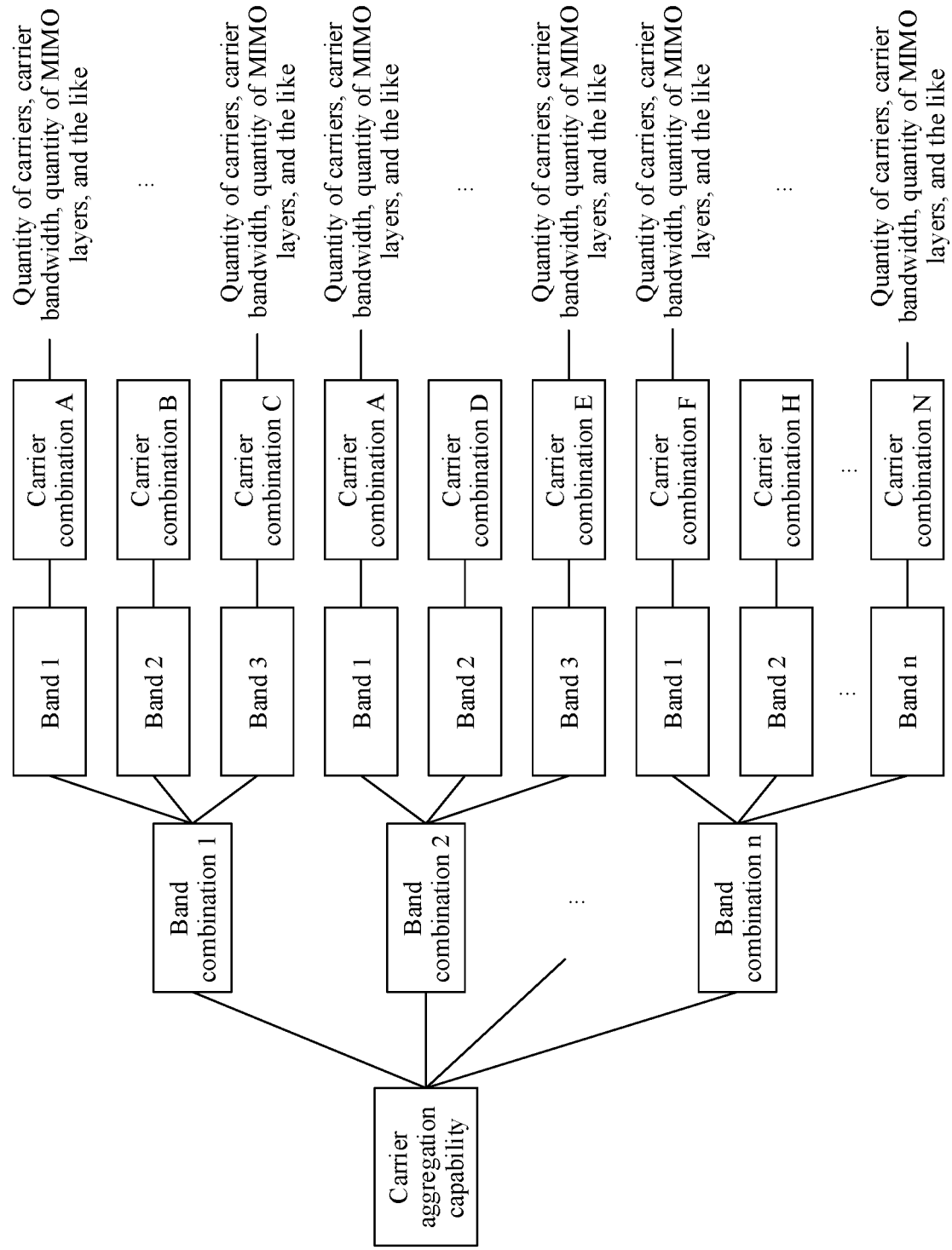
FIG. 1 is a schematic structural diagram of a carrier aggregation capability according to an embodiment of this application.

The following describes technical solutions of this application with reference to the accompanying drawings.

The technical solutions in the embodiments of this application may be applied to a long term evolution (LTE) architecture, and may further be applied to a universal mobile telecommunications system (UMTS) terrestrial radio access network (UTRAN) architecture, or a global system for mobile communications (GSM)/enhanced data rates for GSM evolution (EDGE) system radio access network (GERAN) architecture. In the UTRAN architecture or the GERAN architecture, a function of a mobility management entity (MME) is implemented by a serving general packet radio service (GPRS) support node (SGSN), and a function of an SGW/PGW is implemented by a gateway GPRS support node (GGSN). The technical solutions in the embodiments of the application may further be applied to another communications system, such as a public land mobile network (PLMN) system, or even a 5G communications system or a communications system after 5G. This is not limited in the embodiments of the application.

The embodiments of the application relate to a user terminal. The user terminal may be a device that has a wireless transceiver function and that can cooperate with a network device to provide a communication service for a user. Specifically, the user terminal may be user equipment (UE), an access terminal, a subscriber unit, a subscriber station, a mobile station, a mobile station, a remote station, a remote terminal, a mobile device, a terminal, a wireless communications device, a user agent, or a user apparatus. For example, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, or a terminal device in a future 5G network or a network after 5G. This is not limited in the embodiments of the application.

The embodiments of the application further relate to an access network device. The access network device may be a device configured to communicate with the user terminal, and for example, may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, a vehicle-mounted device, a wearable device, a network-side device in the future 5G network or the network after 5G, or a network device in a future evolved PLMN network.

The embodiments of the application relate to a radio access network (RAN) device. The RAN device is connected to the terminal device, and is configured to receive data from the terminal device and send the data to a core network device. The RAN device corresponds to different devices in different communications systems, for example, corresponds to a base station and a base station controller in a 2G system, corresponds to a base station and a radio network controller (RNC) in a 3G system, corresponds to an evolved NodeB (eNB) in a 4G system, and corresponds to an access network device (for example, a gNB, a CU, or a DU) in a 5G system such as a new radio access system (NR).

The embodiments of the application further relate to the core network (CN) device. The CN device corresponds to different devices in different communications systems, for example, corresponds to a serving GPRS support node (SGSN) or a gateway GPRS support node (GGSN) in the 3G system, corresponds to a mobility management entity (MME) or a serving gateway (S-GW) in the 4G system, and in the 5G system, corresponds to a core network-related device (for example, an NG-Core) in the 5G system.

For ease of understanding of this application, related technological knowledge in the embodiments of this application is first described herein.

In 3rd generation partnership project (the 3rd Generation Partnership Project, 3GPP) specifications of a UTRAN, it has been agreed to use radio resource control (RRC) signaling to transmit radio network-related capability information of UE (namely, UE capabilities) from the UE to an eNB. In other words, in this application, user terminal capabilities may be understood as and are consistent with the UE capabilities. Different UE supports different capabilities due to different hardware or software versions. When making various event decisions or executing various algorithms, a network side needs to learn of a capability of UE, to configure an appropriate working mode for the UE and make a most proper decision.

The UE capabilities include various RAN-related capabilities and various CN-related capabilities. The RAN-related UE capabilities may include: a packet data convergence protocol (PDCP) capability (for example, a supported compression header type), a transmission channel capability (for example, a maximum transmission channel or a receive bit), a measurement capability (for example, multi-carrier measurement), and the like. The CN-related UE capabilities may include an inter-system packet switched (PS) domain handover capability, a multicast service (MBMS) capability, and the like. It should be noted that, as requirements of the UE on a service transmission rate and a data volume become increasingly high, the network side increasingly requires the UE to report a carrier aggregation (CA) capability of the UE. For example, in a long term evolution (LTE) network, two to five LTE component carriers (CC) are aggregated by using a CA technology, to implement a maximum transmission bandwidth of 100 MHz, and improve uplink and downlink transmission rates. FIG. 1 is a schematic structural diagram of a CA capability. As shown in FIG. 1, the CA capability includes n band combinations, where n is a positive integer greater than 1. Each band combination includes different types of bands, the different types of bands correspond to different types of carrier combinations, and the different types of carrier combinations correspond to different quantities of carriers, different carrier bandwidths, different subcarrier spacings, different quantities of multiple-input multiple-output system (MIMO) layers, and the like. For example, a band combination 1 includes a band 1, a band 2, and a band 3. The band 1 corresponds to a carrier combination A, and this may indicate that the UE supports only one carrier in a downlink. The band 2 corresponds to a carrier combination B, and this may indicate that the UE supports carrier aggregation of two CCs in the downlink. The band 3 corresponds to a carrier combination C, and this may indicate that the UE supports carrier aggregation of three CCs in the downlink. A band combination 2 includes a band 1, a band 2, and a band 3. The band 1 corresponds to a carrier combination A. The band 2 corresponds to a carrier combination D, and this may indicate that the UE supports carrier aggregation of four CCs in the downlink. The band 3 corresponds to a carrier combination E, and this may indicate that the UE supports carrier aggregation of five CCs in the downlink. It should be noted that, for a same band, if the band corresponds to a same carrier combination and a same capability parameter, the band indicates a same band (for example, the band 1); or if the band corresponds to different carrier combinations and different capability parameters, the band indicates different bands (for example, the band 2 and the band 3). After obtaining the CA capability of the UE, the network side may learn of a combination of which bands is specifically supported by the UE, and may perform proper carrier aggregation configuration for the UE based on the band combination.

Figure 2:
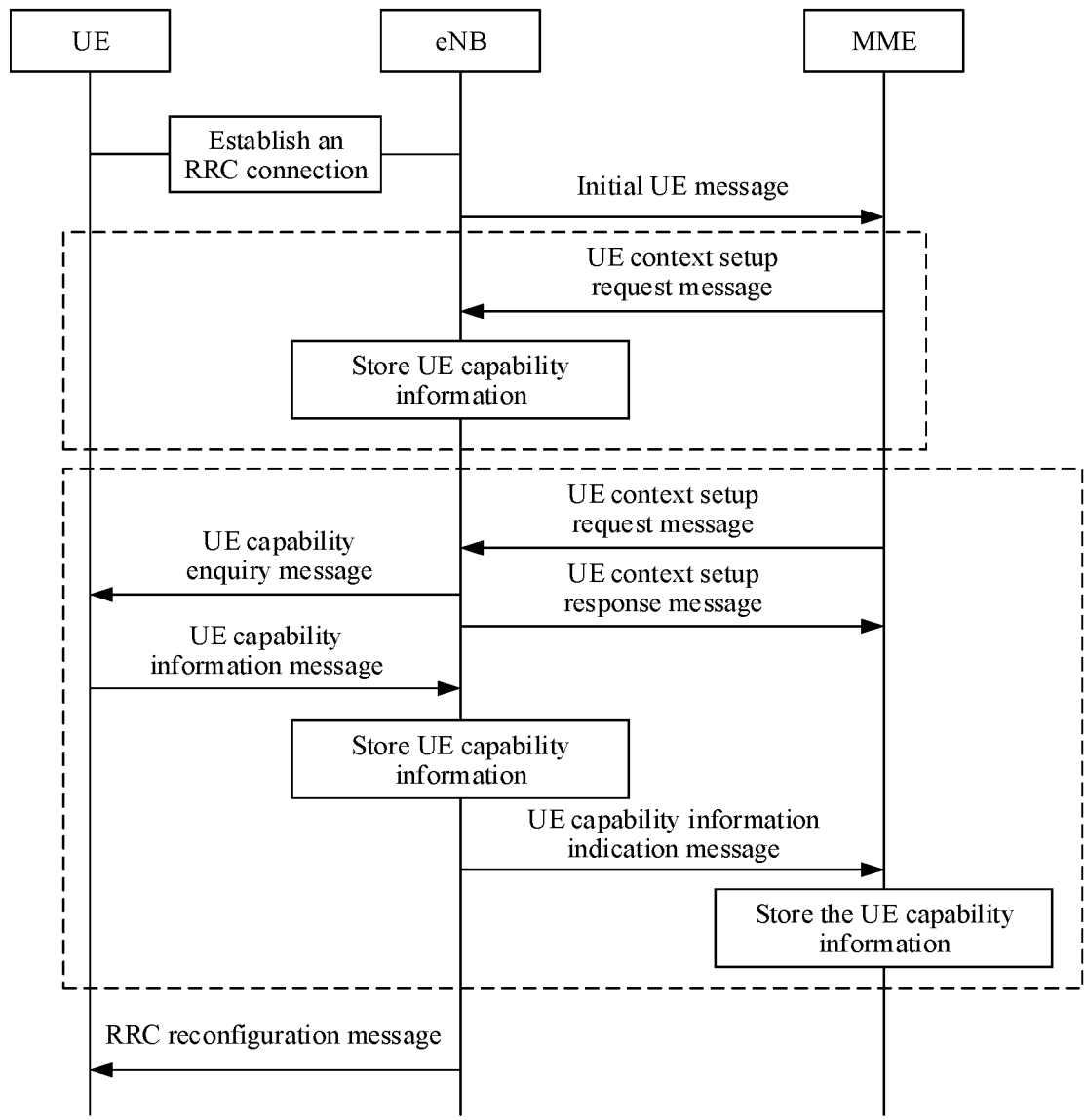
FIG. 2 is a schematic flowchart of report of a UE capability according to an embodiment of this application.

FIG. 2 is a schematic flowchart of report of a UE capability. UE first establishes an RRC connection to an eNB, and the UE enters a connected state from an idle state. After the RRC connection is established, the eNB sends an initial UE message to an MME. After receiving the message, the MME checks whether UE capability information corresponding to the UE has been stored, and if the MME has stored the UE capability information of the UE, the MME sends, to the eNB, a UE context setup request message carrying the UE capability information of the UE. After receiving the UE context setup request message, the eNB stores the UE capability information carried in the UE context setup request message, and modifies a parameter of a transmission link of the UE based on the UE capability information, to facilitate data transmission performed by the UE. If the MME has not stored the UE capability information of the UE, the MME sends a UE context setup request message to the eNB. After receiving the message, the eNB sends a UE capability enquiry message to the UE, and sends a UE context setup response message to the MME. After receiving the request message, the UE sends, to the eNB, a UE capability information message carrying the UE capability information of the UE. After receiving the message, the eNB stores the UE capability information carried in the message, and sends, to the MME, a UE capability information indication message carrying the UE capability information or a dedicated S1 message that is introduced for carrying the UE capability information and that carries the UE capability information. After receiving the message, the MME stores the UE capability information carried in the message.

Figure 3:
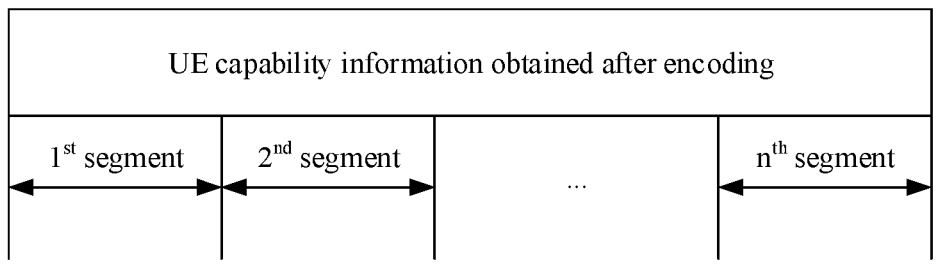
FIG. 3 is a schematic diagram of segmentation of UE capability information according to an embodiment of this application.

When reporting the UE capabilities, the UE needs to encode, according to an encoding rule such as an abstract syntax notation (ASN.1), all the UE capabilities supported by the UE, to obtain UE capability information after the encoding, and sends, to the eNB by using an RRC message, the capability information obtained after the encoding. Currently, a maximum value of a size of an RRC message that can be transmitted over an air interface is 9 kbit. However, as the UE capabilities supported by the UE become increasingly strong, and the UE capability information generated after the encoding becomes increasingly large, the RRC message carrying the UE capability information may be transmitted by using more than 65 kbit or even 1 Gbit that is much larger than a size of an existing RRC message. To report the complete UE capabilities to the eNB, the UE needs to split the UE capability information obtained after the encoding, to obtain a plurality of segments of capability information that meet a condition, and sends, to the eNB, the plurality of segments of capability information that are obtained after the splitting. After receiving all the segments of capability information, the eNB splices all the segments, and then decodes the complete capability information obtained after the splicing, to obtain the UE capability information. FIG. 3 is a schematic diagram of segmentation of UE capability information. As shown in FIG. 3, the UE encodes all UE capabilities according to the encoding rule, namely, the ASN.1, to obtain complete UE capability information after the encoding. The UE splits the UE capability information to obtain n segments of capability information. The UE may evenly split the UE capability information based on a value of a quantity of bits, to obtain the n segments of capability information with the same quantity of bits, where n is a positive integer greater than or equal to 1.

It should be noted that the eNB can perform decoding and successfully obtain the complete UE capability information, only after receiving all the segments of capability information. If the UE capability information is excessively large, and too many segments of capability information are obtained after the splitting, the UE requires a longer time to transmit the segments of capability information. As a result, the UE occupies an air interface resource for a long time, a delay in a report process of the UE capabilities is relatively high, and an error is easy to occur in a transmission process. Consequently, the eNB cannot correctly receive all the segments of capability information, and reliability in the entire report process of the UE capabilities is relatively low.

This application provides a method for transmitting user terminal capability information, to effectively resolve problems of a relatively high delay and relatively low reliability in a report process of UE capabilities, thereby flexibly obtaining UE capability information, and improving efficiency of obtaining the UE capability information.

Figure 4:
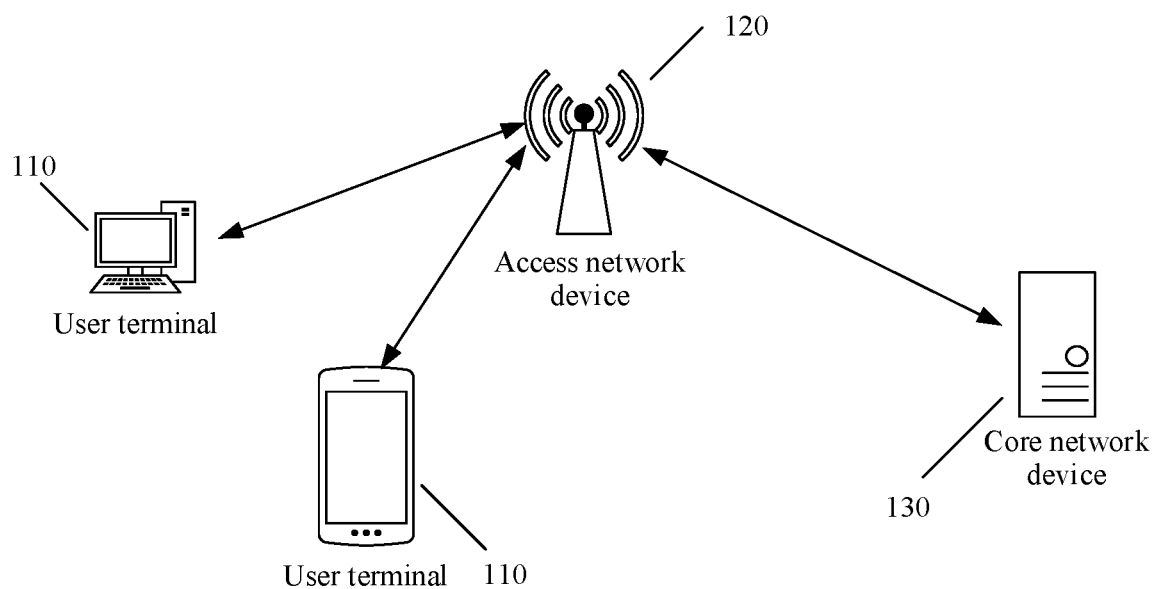
FIG. 4 is a schematic diagram of a system architecture according to an embodiment of this application.

FIG. 4 is a schematic diagram of a system architecture according to an embodiment of this application. As shown in FIG. 4, the network architecture includes a user terminal 110, an access network device 120, and a core network device 130. The access network device 120 provides a radio access service for the user terminal 110. Each access network device 120 corresponds to one service coverage area, and the user terminal 110 entering the area may communicate with the access network device 120 by using a radio signal. The user terminal 110 receives UE capability information enquiry message sent by the access network device 120, and reports UE capability information of the user terminal 110 to the access network device 120 by using an RRC message. Particularly, the user terminal 110 may report the UE capability information of the user terminal 110 by sending a plurality of RRC messages to the access network device 120. After receiving the UE capability information, the access network device 120 stores the UE capability information, and sends the UE capability information to the core network device 130, so that the core network device 130 stores the UE capability information. Particularly, the access network device 120 may segment the UE capability information and send segments of UE capability information to the core network device 130. For example, the access network device 120 may send a plurality of S1 messages, and each S1 message carries a part of the UE capability information. The access network device 120 modifies and configures a parameter of a transmission link of the user terminal 110 based on the UE capability information reported by the user terminal 110, so that the user terminal 110 can perform data transmission.

The following describes the method and a related apparatus in the embodiments of this application in detail with reference to the accompanying drawings. It should be noted that a presentation sequence of the embodiments of this application represents only a sequence of the embodiments, and does not represent priorities of the technical solutions provided in the embodiments.

Figure 5:
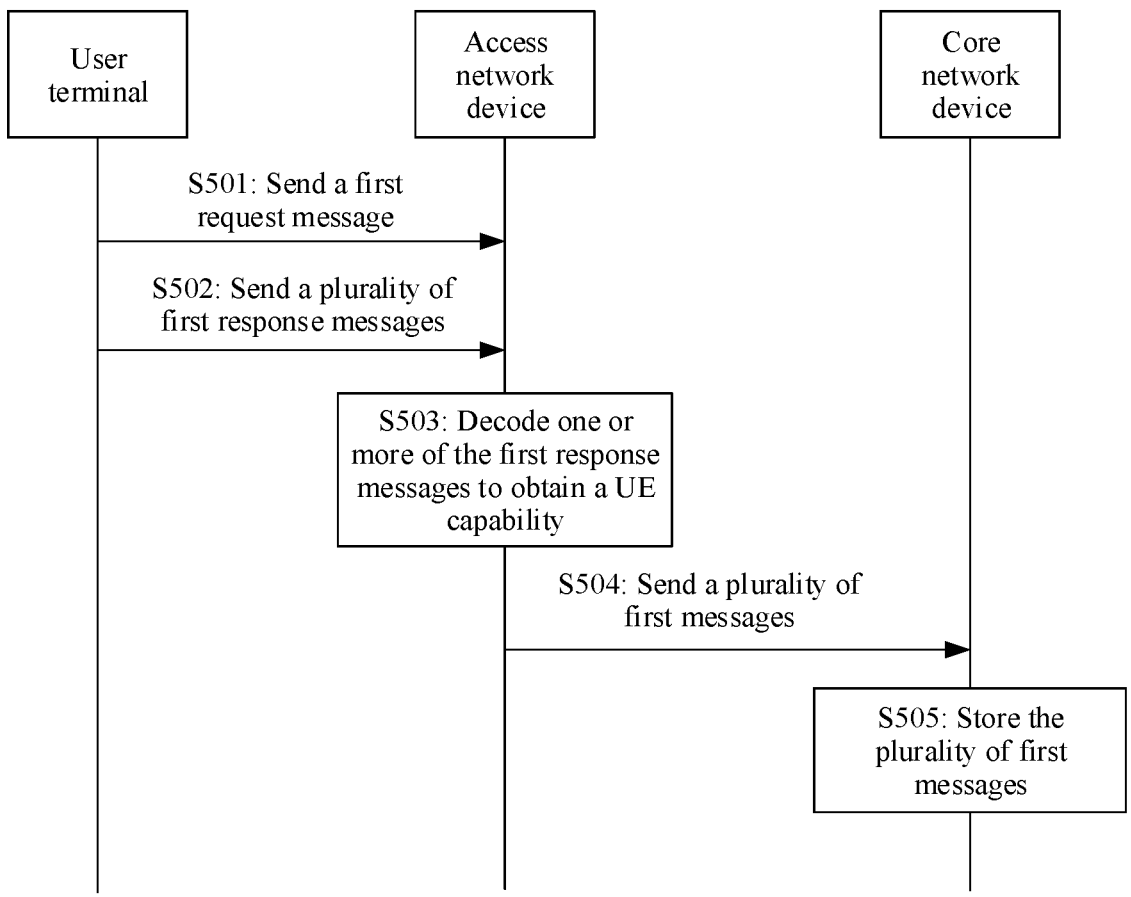
FIG. 5 is a schematic flowchart of a method for transmitting user terminal capability information according to an embodiment of this application.

FIG. 5 is a schematic flowchart of a method for transmitting user terminal capability information according to an embodiment of this application. A user terminal, an access network device, and a core network device shown in FIG. 5 may respectively correspond to the user terminal 110, the access network device 120, and the core network device 130 shown in FIG. 4. As shown in FIG. 5, the method includes but is not limited to the following steps.

S501: The access network device sends a first request message to the user terminal.

Specifically, the user terminal may be stationary or moving, and may be represented by using another name, for example, a mobile station (MS), a mobile terminal (MT), a subscriber station (SS), a wireless apparatus, a personal digital assistant (PDA), a wireless modem, a handheld apparatus, or the like. The access network device may be a base station, and may also be represented by using another name, for example, an evolved NodeB (eNB), a base transceiver system (BTS), an access point (AP), a femto base station, a home NodeB, or a relay device.

It may be understood that because user terminals are different and support different capabilities, the access network device needs to learn of UE capabilities of each user terminal to better serve the user terminal, thereby configuring an appropriate working mode for the user terminal.

Specifically, before the access network device sends the first request message to the user terminal, the user terminal needs to establish a radio resource control (RRC) connection to the access network device.

It should be noted that, after the user terminal establishes the RRC connection to the access network device, the access network device needs to send an initial UE message to the core network device. When the core network device does not store UE capability information of the related user terminal, after receiving a UE context setup request message sent by the core network device, the access network device sends the first request message to the user terminal. The first request message may be a UE capability information enquiry message.

In a possible implementation, a capability information set includes at least one of the following: a band combination, a feature set, or a non-carrier aggregation capability that are supported by the user terminal.

Specifically, the UE capability information includes non-carrier aggregation capability information (for example, single-carrier capability information), carrier aggregation (CA) capability information, and the feature set. A CA capability includes a plurality of band combinations, and different band combinations may carry a part of the UE capability information, to form a subset of the UE capability information. Because too many band combinations cause excessively large CA capability information, the user terminal needs to send a plurality of RRC messages to complete report of the CA capability information. The non-carrier aggregation capability information is basic capabilities of the UE, and these capabilities may be applied to a single-carrier working mode, or may be applied to a multi-carrier working mode, and include, for example, a packet data convergence protocol (PDCP) capability, a medium access control (MAC) capability, a radio link control (RLC) capability, a physical layer (PHY) capability, a UE measurement capability, and the like of the UE. It should be noted that the foregoing band combination may alternatively include only one band and one carrier. In this case, the band combination is used to indicate a single-carrier working capability of the UE.

In a possible implementation, the first request message includes at least one of the following:

first indication information, where the first indication information is used to indicate that the user terminal is allowed to send a plurality of first response messages;

first priority information, where the first priority information is used to indicate a band combination that is to be preferentially reported; or a first value, where the first value is used to indicate a maximum value of a size of each of the first response messages allowed to be sent by the user terminal.

Optionally, the access network device may add the first indication information to the first request message sent to the user terminal. The first indication information may be an indication identifier, an indication field, or in another form. After receiving the first request message, the user terminal parses the first request message to obtain the first indication information, learns that the access network device allows the user terminal to send a plurality of response messages to complete report of the UE capability information, and splits, based on the first indication information, the UE capability information for reporting by using a plurality of messages.

Optionally, before sending the first request message to the user terminal, the access network device receives indication information sent by the user equipment. The indication information is used to indicate that the user equipment can send capabilities of the terminal by using a plurality of response messages. Specifically, the indication information may be carried in an RRC connection setup complete message or an RRC connection setup request message.

It should be noted that, when splitting the UE capability information, the user terminal performs a determining and selection process instead of randomly splitting the UE capability information. The user terminal needs to ensure that a plurality of segments of UE capability information obtained through splitting can remain complete and each segment of UE capability information can be separately encoded according to an encoding rule. The user terminal sends, to the access network device by using an RRC message, each segment of UE capability information that is separately encoded, so that the access network device can decode the UE capability information included in each received RRC message. For example, the UE capability information of the user terminal includes the CA capability information, and the CA capability includes 1000 band combinations. The user terminal selects 100 band combinations from the 1000 band combinations as a subset of the UE capability information set, encodes the 100 band combinations according to the encoding rule, and pads the $1^{st}$ response message with the 100 encoded band combinations. The user terminal further selects 100 band combinations from remaining band combinations as another subset of the UE capability information set, encodes the 100 band combinations according to the encoding rule, and pads the $2^{nd}$ response message with the 100 encoded band combinations. The user terminal may perform selection and encoding on remaining band combinations according to a same principle, and pad another response message with encoded band combinations.

It may be understood that, it can be ensured through splitting that each response message includes an integer quantity of band combinations, that is, each segment of UE capability information is complete and separately encoded. Each response message may be decoded to obtain a band combination included in the response message, to obtain the segment of UE capability information.

It should be noted that the foregoing encoding rule may be an abstract syntax notation (ASN.1), or may be another encoding rule. When selecting a band combination, the user terminal may randomly select the band combination, and a quantity of band combinations selected each time may be the same or may be different. This is not limited in this application.

Optionally, if the access network device needs to preferentially obtain a part of the UE capability information of the user terminal, the access network device may include the first priority information in the first request message, so that the user terminal can preferentially report a band combination corresponding to the priority information.

Further, the first priority information may include band information, a subcarrier spacing, a MIMO capability, a quantity of aggregated carriers, or a carrier aggregation bandwidth. The user terminal may determine, based on the first priority information, a band combination or information that needs to be preferentially padded with and sent to the access network device. For example, the user terminal may determine, based on the priority information, frequency information that needs to be preferentially reported, and pad, with the frequency information, a response message (for example, the $1^{st}$ response message and a subsequent response message) sent earlier. Alternatively, the user terminal may determine, based on the priority information, bandwidth information that needs to be preferentially reported, and pad, with the bandwidth information, a response message sent earlier. Alternatively, the user terminal may determine, based on the priority information, a combination of MIMO capabilities that needs to be preferentially reported, and pad, with the combination, a response message sent earlier. Alternatively, the user terminal may determine, based on the priority information, another band combination that needs to be preferentially reported, and pad, with the another band combination, a response message sent earlier. This is not limited in this application.

Optionally, if the access network device needs to set the maximum value of a size of each response message that is to be sent by the user terminal, the access network device may include the first value in the first request message, so that the user terminal sends the plurality of response messages based on the first value, where each response message includes a part of the UE capability information.

It should be noted that, currently, a maximum value of a size of an RRC message that can be transmitted over an air interface is 9 kbit. Therefore, the first value that is set by the access network device cannot exceed 9 kbit, and for example, may be set to 8 kbit, 5 kbit, or 3 kbit. A specific value to which the first value is set is not limited in this application.

It may be understood that the access network device may set, based on a requirement, the maximum value of a size of each response message to be reported by the UE, that is, set and limit a size of UE capability information included in each response message. In a subsequent processing process in which, for example, the access network device sends the UE capability information to the core network device, the UE capability information can be prevented from being split or combined again to meet a transmission requirement between the access network device and the core network device. For example, a size of the UE capability information included in each response message received by the access network device is 8 kbit, but only a message of 6 kbit can be transmitted between the access network device and the core network device. In this case, the access network device needs to split the UE capability information to meet the transmission requirement between the access network device and the core network device. Therefore, setting, by the access network device, the UE capability information reported by the user terminal can simplify a forwarding process of the access network device, thereby improving forwarding efficiency.

S502: The user terminal sends the plurality of first response messages to the access network device.

Specifically, each response message sent by the user terminal to the access network device includes a subset of the UE capability information set.

Specifically, before the user terminal sends the plurality of first response messages to the access network device, the access network device needs to send a UE context setup response message to the core network device.

In a possible implementation, the $1^{st}$ first response message received by the access network device includes at least one of the following:

a second value, where the second value is a quantity of first response messages obtained by the user terminal through calculation based on the first value or a default value (for example, a maximum value of a size of a PDCP payload);
  a first band combination, where a quantity of uplink carriers or a quantity of downlink carriers in the first band combination is less than or equal to a first threshold, and the first threshold is preset by the user terminal or is configured by the access network device;
  a second band combination, where an uplink carrier aggregation bandwidth or a downlink carrier aggregation bandwidth in the second band combination is less than or equal to a second threshold, and the second threshold is preset by the user terminal or is configured by the access network device;
  a first capability combination, where the first capability combination includes the non-carrier aggregation capability; or
  the feature set supported by the user terminal.

Optionally, the user terminal may add the second value to the 1st response message to be sent to the access network device. The second value indicates the quantity of first response messages that need to be sent by the user terminal. For example, the second value is 5, and it indicates that the user terminal needs to send a total of five response messages to complete report of the entire UE capability information, or needs to further send five response messages to complete report of the entire UE capability information. After receiving the second value, the access network device may learn of in advance a specific quantity of response messages that need to be sent by the user terminal to complete a report process of the entire UE capability information.

Specifically, before sending the 1st response message, the user terminal may split the supported UE capability information based on the first value that is set by the access network device. If the access network device does not set the first value, the UE capability information may be split based on the default value (for example, 9 kbit). For example, if the first value that is set by the access network device is 6 kbit, and the UE capability information supported by the user terminal is 50 kbit, the user terminal may learn through calculation that the user terminal needs to send nine response messages to complete the report of the entire UE capability information. In this case, the second value is 9.

Further, in a splitting process, the user terminal needs to ensure integrity of each segment of UE capability information obtained after the splitting, so that each segment of UE capability information can be separately encoded. For example, several band combinations may be grouped into a same segment, then each segment is separately encoded according to the encoding rule such as the abstract syntax notation (ASN.1), to obtain a plurality of segments of encoded UE capability information, and then the plurality of response messages are padded with the plurality of segments of UE capability information.

Optionally, the user terminal may include the first band combination in the 1st response message to be sent to the access network device, and the quantity of uplink carriers or the quantity of downlink carriers in the first band combination is less than or equal to the first threshold. The first threshold is preset by the user terminal or is configured by the access network device.

Optionally, the user terminal may include the second band combination in the 1st response message to be sent to the access network device, and the uplink carrier aggregation bandwidth or the downlink carrier aggregation bandwidth in the second band combination is less than or equal to the second threshold. The second threshold is preset by the user terminal or is configured by the access network device.

Specifically, the first band combination and the second band combination both correspond to some lower-order CA capabilities, and these lower-order CA capabilities are preferentially used in a network. After obtaining these CA capabilities and the first band combination or the second band combination corresponding to these CA capabilities, the access network device and the core network device may complete modification, configuration, and the like of a parameter of a transmission link of the user terminal, to meet requirements of most services of the user terminal. Therefore, the user equipment needs to report the first band combination or the second band combination as soon as possible.

Further, the first threshold and the second threshold may be configured by the access network device and notified to the user terminal by using the first request message. Alternatively, the user terminal may set the first threshold and the second threshold based on a service requirement of the user terminal or according to another rule, and report the first band combination or the second band combination based on the first threshold or the second threshold. For example, the user terminal identifies the service requirement of the user terminal, and identifies that quantities of downlink carriers required for most services of the user terminal are less than or equal to 3. In this case, the user terminal pads the first band combination with all band combinations in which quantities of downlink carriers are less than or equal to 3, and preferentially reports the first band combination. Alternatively, the user terminal identifies that downlink carrier aggregation bandwidths required for most services of the user terminal are less than or equal to 100 MHz. In this case, the user terminal pads the second band combination with all band combinations in which downlink carrier aggregation bandwidths are less than or equal to 100 MHz, and preferentially reports the second band combination.

It should be noted that, if the first band combination or the second band combination is excessively large and therefore cannot be reported by using the $1^{st}$ response message, the $2^{nd}$ response message and a subsequent response message may continue to be padded, to complete whole report of the first band combination or the second band combination.

Optionally, the user terminal may include the first capability combination in the 1st response message to be sent to the access network device. The first capability combination may include the non-carrier aggregation capability.

Specifically, the non-carrier aggregation capability (namely, a single-carrier capability) can support most services that do not have high requirements on a transmission rate and a transmission bandwidth; and for the user terminal, the non-carrier aggregation capability can support many basic services. The non-carrier aggregation capability is very basic and has a relatively high priority level. Therefore, the non-carrier aggregation capability is very important for the user terminal. As a result, the user terminal needs to report the non-carrier aggregation capability to the access network device in advance. In this way, the access network device can obtain the non-carrier aggregation capability of the user terminal in advance, and modifies and configures the parameter of the transmission link of the user terminal, so that the user terminal can perform data transmission.

In addition, compared with the CA capability, the non-carrier aggregation capability has fewer band combinations. Therefore, a quantity of bits that corresponds to the non-carrier aggregation capability is relatively small, and the user terminal may report all non-carrier aggregation capabilities to the access network device by using the $1^{st}$ response message.

Optionally, the user terminal may include, in the $1^{st}$ response message to be sent to the access network device, the feature set supported by the user terminal.

Specifically, in a new radio (NR) capability design, a band combination includes supported capabilities for the band combination, such as a quantity of carriers, a carrier bandwidth, a subcarrier spacing (SCS), and a quantity of MIMO layers. Each band combination may directly carry this capability information, and the capability information is sent to the access network device by using the band combination.

Further, the capability information may be placed in the feature set. A specific capability (for example, the quantity of carriers, the carrier bandwidth, the SCS, or the quantity of MIMO layers) in the feature set is cited, in an ID form, to the band combination. However, each capability in the feature set does not have an explicit ID, and the specific capability can be determined based only on a sequence number of the specific capability in the feature set. For example, there are 100 capability elements in the feature set, a quantity of carriers that corresponds to the $5^{th}$ element is 2, each carrier bandwidth is 50 MHz, a subcarrier spacing of each carrier is 15 kHz, and an ID of the $5^{th}$ element may be represented as 5. In this case, the $5^{th}$ capability element in the feature set is cited, to cite these specific capabilities to a band combination.

It may be understood that, because the CA capability includes a large quantity of band combinations, and the foregoing capabilities such as the quantity of carriers, the carrier bandwidth, the SCS, the quantity of MIMO layers may be cited to each band combination. Consequently, there may be a large quantity of repeated capabilities among the band combinations. If each band combination carries capability information that needs to be cited to the band combination, a final UE capability information set may be excessively large, and more response messages need to be sent to complete the report of the UE capability information, causing a waste of a transmission resource and a storage resource. Therefore, capability information that has a common characteristic and that needs to be cited to all the band combinations is placed in a set (namely, the feature set), and specific capability information in the feature set is cited, in the ID form, to each band combination, so that the user terminal can resolve a problem of an excessively large UE capability information set, and can complete the report of all the UE capability information by sending relatively few response messages, thereby effectively reducing the waste of the transmission resource and the storage resource. Each element in the feature set may include a combination of one or more feature set of one or more bands, and a feature set of each band may further include a combination of a feature set of one or more carriers.

It should be noted that, if the feature set is excessively large, and consequently report of the complete feature set cannot be completed in the $1^{st}$ response message, the user terminal may preferentially report, in the $1^{st}$ response message, a feature set related to the single-carrier capability, or a feature set related to the first band combination and the second band combination, or a feature set related to another band combination to be reported in the $1^{st}$ response message. Another feature set may be carried in the $2^{nd}$ response message and a subsequent response message, to complete the report.

It should be noted that, the feature set includes the capability information that needs to be cited to the band combination, and therefore needs to be sent to the access network device in advance, so that the access network device can decode each received response message and obtain the UE capability information with reference to the feature set. Therefore, the $1^{st}$ response message may carry the feature set supported by the user terminal, so that the access network device obtains the feature set in advance. Certainly, the feature set may alternatively be carried in another message to be sent to the access network device.

In a possible implementation, the last first response message received by the access network device includes second indication information, and the second indication information is used to indicate that the user terminal has completed report of the UE capability information set.

Specifically, when sending the plurality of first response messages to the access network device, the user terminal may include the second indication information in the last response message, where the second indication information may be an indication identifier, an indication field, or in another form. After receiving the last response message, the access network device may determine, based on the second indication information in the last response message, that the user terminal has completed the report of the entire UE capability information set, and terminate a receiving process.

In a possible implementation, the access network device sends third indication information to the user terminal, so that the user terminal stops, based on the third indication information, sending a first response message that has not been sent.

Specifically, the access network device may stop, in the receiving process based on an actual requirement, receiving the first response message sent by the user terminal. For example, after receiving an $N^{th}$ response message, the access network device may determine to stop receiving another response message. In this case, the access network device sends the third indication information to the user terminal, so that the user terminal stops, based on the third indication information, sending another response message that has not been sent. N is a positive integer greater than or equal to 1, and the third indication information may be an indication identifier, an indication field, or in another form.

Optionally, the third indication information includes a third value, and the third value is used to indicate the $n^{th}$ first response message, so that after completing sending of the $n^{th}$ first response message, the user terminal stops sending the first response message that has not been sent, where n is a positive integer greater than or equal to 1.

Specifically, the access network device may include the third value in the third indication information. After receiving the third value, the user terminal learns that sending of the response message needs to be stopped in advance. Therefore, in a process of sending the UE capability information, after sending a response message corresponding to the third value, the user terminal stops sending the response message that has not been sent. For example, if the third value included by the access network device in the third indication information is 5, it indicates that the $n^{th}$ response message is the $5^{th}$ response message. In this case, after receiving the third indication information, the user terminal sends a plurality of response messages to the access network device, and after sending the $5^{th}$ response message, the user terminal stops sending a remaining response message.

It may be understood that the access network device may send the third indication information to the user terminal, to stop, in advance, the user terminal from continuing to send the another response message that has not been sent, and release an air interface resource in time, thereby improving utilization of the air interface resource.

In a possible implementation, the first response message further includes a subset of the feature set. The subset of the feature set includes fourth indication information, and the fourth indication information is used to indicate a location number, in the feature set, of the $1^{st}$ element in the subset. The feature set is a sum of all feature sets supported by the terminal Specifically, the feature set includes too much capability information, and consequently cannot be transmitted by using one response message. In this case, the feature set needs to be segmented to obtain a plurality of subsets, and each subset is sent to the access network device by using one response message. However, a specific capability information element in the feature set is determined based on a location sequence of the specific capability information element in the feature set. If the feature set is segmented into a plurality of subsets, after receiving the plurality of subsets, the access network device cannot determine a location sequence, in the original feature set, of a capability information element in each subset. Consequently, the capability information element in the feature set cannot be correctly cited to the band combination.

Figure 6:
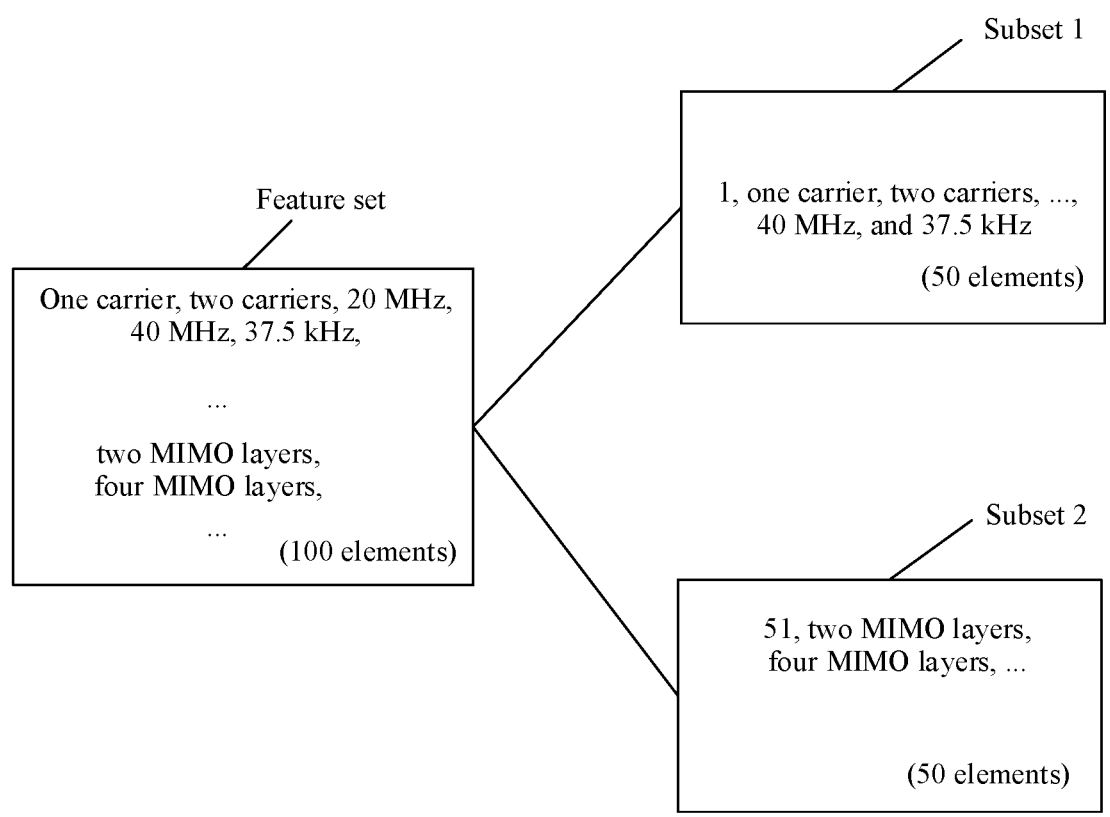
FIG. 6 is a schematic diagram of segmentation of a feature set according to an embodiment of this application.

Further, after segmenting the feature set into the plurality of subsets, the user terminal includes the fourth indication information in each subset, where the indication information is used to indicate the location number, in the original feature set, of the $1^{st}$ capability information element in each subset. After receiving the plurality of subsets, the access network device may determine, based on the fourth indication information in each subset, a location, in the original feature set, of each capability information element in each subset, so that the capability information element, in the feature set, related to the band combination can be correctly cited. FIG. 6 is a schematic diagram of segmentation of a feature set according to an embodiment of this application. As shown in FIG. 6, the feature set includes 100 capability information elements and is divided into a subset 1 and a subset 2, and each subset includes 50 capability information elements. The subset 1 includes the former 50 capability information elements in the feature set, and the subset 2 includes the latter 50 capability information elements in the feature set. The subset 1 further includes a value 1, where the value 1 indicates the $1^{st}$ location, in the original feature set, of the $1^{st}$ element in the subset. The subset 2 further includes a value 51, where the value 51 indicates the 51st location, in the original feature set, of the $1^{st}$ element in the subset 2.

It may be understood that the feature set includes capability information that needs to be cited to the band combination. Therefore, after segmenting the feature set, the user terminal needs to send the subsets to the access network device in advance (where for example, the $1^{st}$ response message carries the subset 1 of the feature set, and the $2^{nd}$ response message carries the subset 2 of the feature set), to ensure that the access network device can obtain the feature set in advance.

S503: The access network device decodes one or more of the first response messages to obtain a UE capability.

Specifically, because the user terminal separately encodes each response message, after receiving the response message sent by the user terminal, the access network device may separately decode each response message according to a decoding rule corresponding to the encoding rule, to obtain a UE capability included in the response message.

Further, after receiving at least one response message sent by the user terminal, the access network device may obtain a part of the UE capabilities of the user terminal through decoding, and then may perform reconfiguration for the user terminal (for example, modify the parameter of the transmission link of the user terminal, so that the user terminal can perform data transmission) based on the obtained part of the UE capabilities. Particularly, in a process of performing reconfiguration for the user terminal, the access network device may further continue to receive another response message. For example, after receiving the $1^{st}$ response message sent by the user terminal, the access network device decodes the $1^{st}$ response message to obtain a part of the UE capabilities. The access network device starts to perform reconfiguration for the user terminal based on the obtained part of the UE capabilities, and simultaneously receives the $2^{nd}$ response message sent by the user terminal.

In a possible implementation, when the first response message includes the subset of the feature set, the decoding the first response message to obtain a UE capability includes: decoding the first response message to obtain the subset of the UE capability information set and the subset of the feature set, and obtaining the UE capability based on the subset of the UE capability information set and the subset of the feature set.

Figure 7:
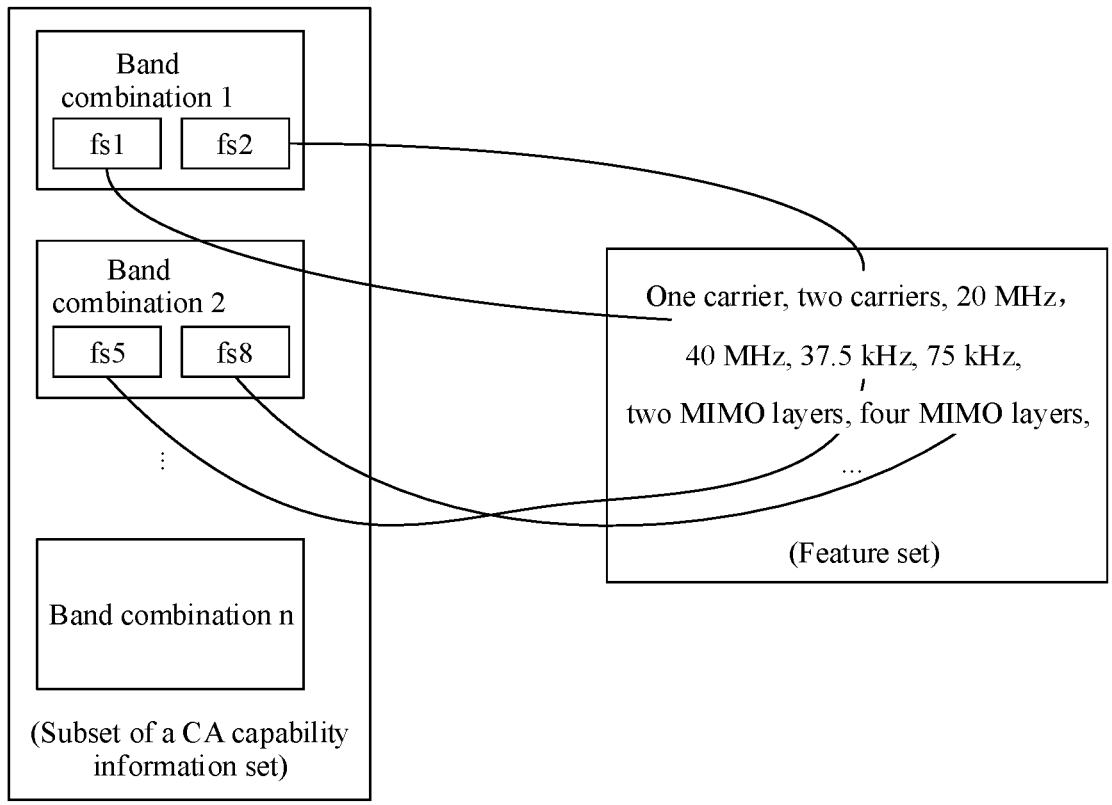
FIG. 7 is a schematic diagram of citation of capability information according to an embodiment of this application.

Specifically, the CA capability information in the UE capability information includes a large quantity of band combinations. Specific capability information for these band combinations is in the feature set. Therefore, the specific capability information in the feature set needs to be cited to the band combinations. FIG. 7 is a schematic diagram of citation of capability information according to an embodiment of this application. As shown in FIG. 7, a subset of a CA capability information set includes n band combinations. Capability information such as a quantity of carriers, a carrier bandwidth, an SCS, and a quantity of MIMO layers that is included in each band combination is in the feature set, and specific capability information is cited to the band combination in each subset of the CA capability information set by citing a location sequence of the capability information. For example, fs1 and fs2 in a band combination 1 indicate that capability information at the $1^{st}$ location and capability information at the $2^{nd}$ location in the feature set need to be cited to the band combination 1, and fs5 and fs8 in a band combination 2 indicate that capability information at the $5^{th}$ location and capability information at the $8^{th}$ location in the feature set need to be cited to the band combination 2.

It should be noted that, when the first response message sent by the user terminal includes the subset of the feature set and the subset of the UE capability information set, the access network device needs to first decode the received response message to separately obtain the subset of the feature set and the subset of the UE capability information set, and obtain the UE capability based on the subset of the feature set and a citation relationship of the band combination in the subset of the UE capability information set.

S504: The access network device sends a plurality of first messages to the core network device.

Specifically, after receiving the plurality of first response messages sent by the user terminal, the access network device obtains the UE capability information. The access network device needs to report the UE capability information to the core network device. The access network device splits the capability information for reporting to the core network device by using a plurality of messages. Each message includes a subset of the UE capability information set, that is, includes several complete band combinations, and can be separately decoded to obtain a part of the UE capability information.

In a possible implementation, the first message includes at least one of the following:
  first identification information, where the first identification information is used to identify a sequence number of the first message; or
  first indication information, where the first indication information is used to indicate whether the access network device has completed report of the UE capability information set.

Optionally, the access network device may include the first identification information in the first message sent to the core network device. The identification information indicates a sequence number of a currently received first message. For example, the first identification information in the first message received by the core network device is 6, it indicates that the first message currently received by the core network device is the $6^{th}$ message.

It may be understood that the access network device adds the first identification information to the first message to identify the sequence number of the first message, to ensure that the messages are in order, and resolve problems of repeated sending and repeated receiving performed by the core network device. In addition, the core network device can recombine, based on the first identification information, the UE capability information obtained through decoding, to facilitate storing performed by the core network device, thereby improving efficiency.

Optionally, the access network device may include the first indication information in the first message sent to the core network device. The first indication information may be an indication identifier, an indication field, or in another form. After receiving the first message, the core network device parses the first message to obtain the first indication information, and determines, based on the first indication information, whether the received first message is the last message. If determining that the first message is the last message, the core network device terminates a receiving process.

It may be understood that the access network device includes the first indication information in the first message to identify whether the message is the last message, to ensure that the core network device can release a connection resource between the core network device and the access network device in time, thereby improving utilization of a transmission resource between the access network device and the core network device.

S505: The core network device stores the plurality of first messages.

It should be noted that, although the foregoing descriptions mainly relate to processing of access stratum (AS) capability information, the principle disclosed herein may also be easily applied to management of a non-access stratum (NAS) part of the UE capability information, and details are not described herein again.

To better implement the foregoing solutions of the embodiments of this application, the following further correspondingly provides related apparatuses that are configured to cooperate to implement the foregoing solutions.

Figure 8:
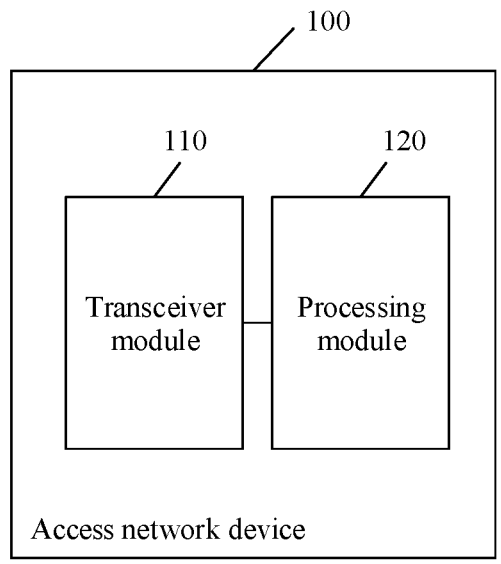
FIG. 8 is a schematic structural diagram of an access network device according to an embodiment of this application.

FIG. 8 is a schematic structural diagram of an access network device 100 according to an embodiment of this application. The access network device 100 includes at least a transceiver module 110 and a processing module 120.

The transceiver module 110 is configured to: send a first request message to a user terminal, and receive a plurality of first response messages sent by the user terminal in response to the first request message, where each of the first response messages includes a subset of a UE capability information set.

The processing module 120 is configured to decode one or more of the first response messages to obtain a UE capability.

In this embodiment of the application, the user terminal sends the plurality of response messages to the access network device based on the first request message, and each of the response messages includes the subset of the UE capability information set. The access network device decodes the one or more of the response messages to obtain the UE capability. In this way, it can be ensured that each response message received by the access network device carries a part of UE capabilities, and can be separately encoded and decoded. Therefore, the solution provided in this application can effectively resolve a problem that excessively large UE capability information cannot be reported at one time, and effectively reduce a report delay of the UE capability information, thereby improving reliability.

In an embodiment, the UE capability information set includes at least one of the following:
  a band combination, a feature set, or a non-carrier aggregation capability that are supported by the user terminal.

In an embodiment, the first request message includes at least one of the following:
  first indication information, where the first indication information is used to indicate that the user terminal is allowed to send the plurality of first response messages;
  first priority information, where the first priority information is used to indicate a band combination that is to be preferentially reported; or
  a first value, where the first value is used to indicate a maximum value of a size of each of the first response messages allowed to be sent by the user terminal.

In an embodiment, the first priority information includes at least one of the following:
  band information, a subcarrier spacing, a MIMO capability, a quantity of aggregated carriers, or a carrier aggregation bandwidth.

In an embodiment, the $1^{st}$ first response message received by the transceiver module 110 includes at least one of the following:
  a second value, where the second value is a value of a quantity of first response messages that need to be sent by the user terminal;
  a first band combination, where a quantity of uplink carriers or a quantity of downlink carriers in the first band combination is less than or equal to a first threshold, and the first threshold is preset by the user terminal or is configured by the access network device;
  a second band combination, where an uplink carrier aggregation bandwidth or a downlink carrier aggregation bandwidth in the second band combination is less than or equal to a second threshold, and the second threshold is preset by the user terminal or is configured by the access network device;
  a first capability combination, where the first capability combination includes a non-carrier aggregation capability; or
  a feature set supported by the user terminal.

In an embodiment, the last first response message received by the transceiver module 110 includes second indication information, and the second indication information is used to indicate that the user terminal has completed report of the UE capability information set.

In an embodiment, the transceiver module 110 is further configured to send third indication information to the user terminal, so that the user terminal stops, in response to the third indication information, sending a first response message that has not been sent.

In an embodiment, the third indication information includes a third value, and the third value is used to indicate an $n^{th}$ first response message, so that after completing sending of the $n^{th}$ first response message, the user terminal stops sending the first response message that has not been sent, where n is a positive integer greater than or equal to 1.

In an embodiment, the first response message further includes a subset of the feature set, the subset of the feature set includes fourth indication information, and the fourth indication information is used to indicate a location number, in the feature set, of the $1^{st}$ element in the subset.

In an embodiment, when the first response message includes the subset of the feature set, the decoding the first response message to obtain a UE capability includes:
  decoding the first response message to obtain the subset of the UE capability information set and the subset of the feature set, and obtaining the UE capability based on the subset of the UE capability information set and the subset of the feature set.

In an embodiment, the transceiver module 110 is further configured to send a plurality of first messages to a core network device, where each of the first messages includes a subset of the UE capability information set.

It may be understood that the transceiver module 110 in this embodiment of this application may be implemented by a transceiver or a transceiver-related circuit component, and the processing module 120 may be implemented by a processor or a processor-related circuit component.

Figure 9:
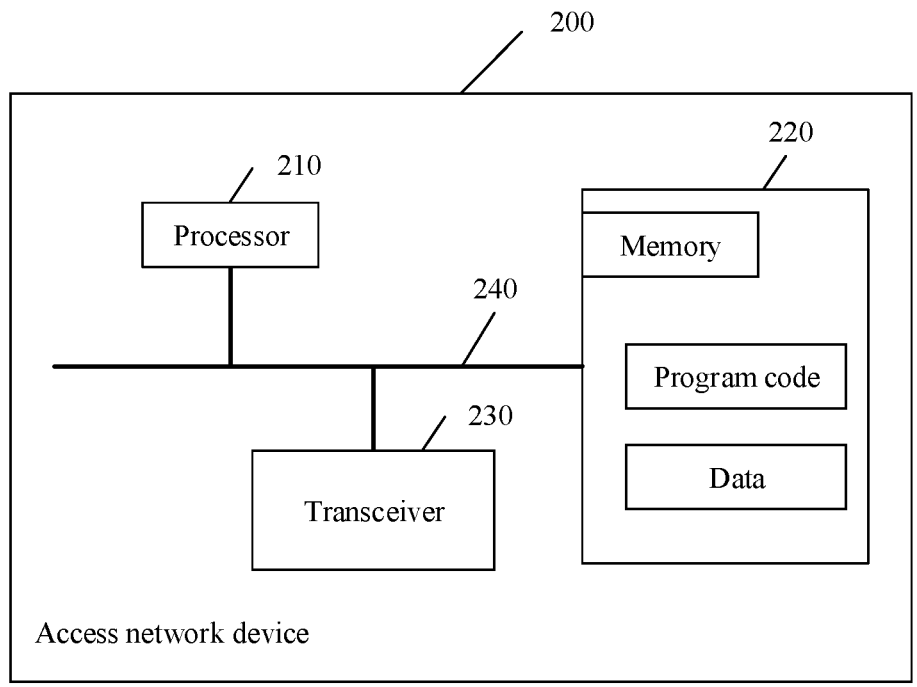
FIG. 9 is a schematic structural diagram of another access network device according to an embodiment of this application.

FIG. 9 is a schematic structural diagram of an access network device 200 according to an embodiment of this application. The access network device 200 includes a processor 210, a memory 220, and a transceiver 230. The processor 210, the memory 220, and the transceiver 230 are connected to each other via a bus 240. The memory 220 stores an instruction or a program, and the processor 210 is configured to execute the instruction or the program that is stored in the memory 220. When the instruction or the program that is stored in the memory 220 is executed, the processor 210 is configured to perform an operation performed by the processing module 120 in the foregoing embodiment, and the transceiver 230 is configured to perform an operation performed by the transceiver module 110 in the foregoing embodiment.

It should be noted that the access network device 100 or the access network device 200 in the embodiments of this application may correspond to the access network device in the method embodiments provided in this application, and operations and/or functions of the modules in the access network device 100 or the access network device 200 are separately used to implement corresponding procedures of the methods in FIG. 5. For brevity, details are not described herein again.

Figure 10:
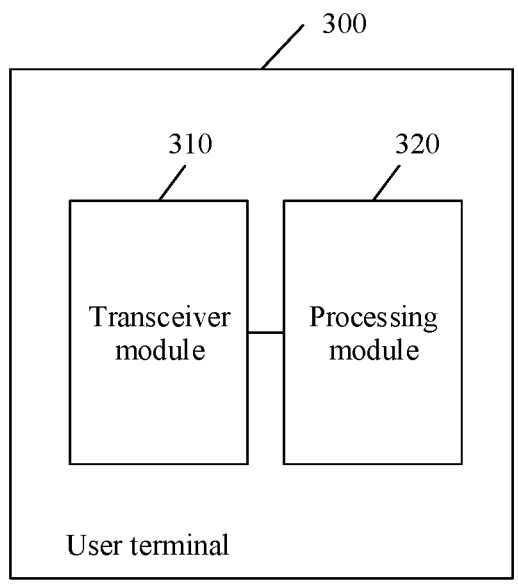
FIG. 10 is a schematic structural diagram of a user terminal according to an embodiment of this application.

FIG. 10 is a schematic structural diagram of a user terminal 300 according to an embodiment of this application. The user terminal 300 includes at least a transceiver module 310 and a processing module 320.

The transceiver module 310 is configured to receive a first request message sent by an access network device.

The processing module 320 is configured to generate a plurality of first response messages in response to the first request message, where each of the first response messages includes a subset of a UE capability information set.

The transceiver module 310 is further configured to send the plurality of first response messages to the access network device.

In this embodiment of this application, the user terminal sends the plurality of response messages to the access network device based on the first request message, and each of the response messages includes the subset of the UE capability information set. The access network device decodes one or more of the response messages to obtain a UE capability. In this way, it can be ensured that each response message sent by the user terminal carries a part of UE capabilities, and can be separately encoded and decoded. Therefore, the solution provided in this application can effectively resolve a problem that excessively large UE capability information cannot be reported at one time, and effectively reduce a report delay of the UE capability information, thereby improving reliability.

In an embodiment, the capability information set includes at least one of the following:
- a band combination, a feature set, or a non-carrier aggregation capability that are supported by the user terminal.

In an embodiment, the first request message includes at least one of the following:
- first indication information, where the first indication information is used to indicate that the user terminal is allowed to send the plurality of first response messages, and the user terminal determines, based on the first indication information, whether the plurality of first response messages can be sent;
- first priority information, where the first priority information is used to indicate a band combination that is to be preferentially reported, and the user terminal determines, based on the first priority information, the band combination that is to be preferentially reported; or
- a first value, where the first value is used to indicate a maximum value of a size of each of the first response messages allowed to be sent by the user terminal, and the user terminal determines the maximum value of a size of the to-be-generated first response message based on the first value.

In an embodiment, the first priority information includes at least one of the following:
- band information, a subcarrier spacing, a MIMO capability, a quantity of aggregated carriers, or a carrier aggregation bandwidth.

In an embodiment, the $1^{st}$ first response message sent by the transceiver module 310 includes at least one of the following:
- a second value, where the second value is a value of a quantity of first response messages that need to be sent by the user terminal;
- a first band combination, where a quantity of uplink carriers or a quantity of downlink carriers in the first band combination is less than or equal to a first threshold, and the first threshold is preset by the user terminal or is configured by the access network device;
- a second band combination, where an uplink carrier aggregation bandwidth or a downlink carrier aggregation bandwidth in the second band combination is less than or equal to a second threshold, and the second threshold is preset by the user terminal or is configured by the access network device;
- a first capability combination, where the first capability combination includes a non-carrier aggregation capability; or
- a feature set supported by the user terminal.

In an embodiment, the last first response message sent by the transceiver module 310 includes second indication information, and the second indication information is used to indicate that the user terminal has completed report of the UE capability information set.

In an embodiment, the transceiver module 310 is further configured to receive third indication information sent by the access network device; and the processing module 320 is further configured to stop, in response to the third indication information, sending a first response message.

In an embodiment, the third indication information includes a third value, and the third value is used to indicate an $n^{th}$ first response message. After completing sending of the $n^{th}$ first response message, the user terminal stops sending the first response message that has not been sent, where n is a positive integer greater than or equal to 1.

In an embodiment, the first response message further includes a subset of the feature set, the subset of the feature set includes fourth indication information, and the fourth indication information is used to indicate a location number, in the feature set, of the $1^{st}$ element in the subset.

It may be understood that the transceiver module 310 in this embodiment of this application may be implemented by a transceiver or a transceiver-related circuit component, and the processing module 320 may be implemented by a processor or a processor-related circuit component.

Figure 11:
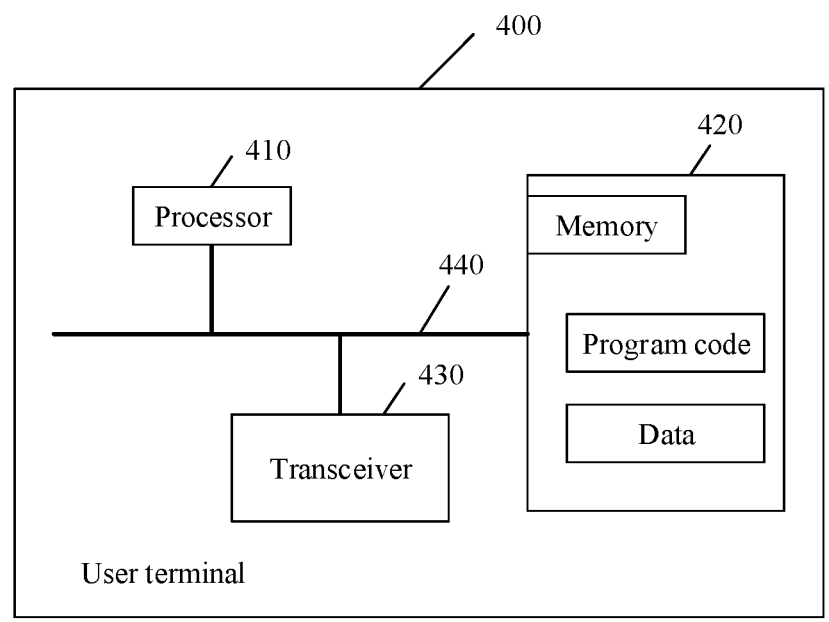
FIG. 11 is a schematic structural diagram of another user terminal according to an embodiment of this application.

FIG. 11 is a schematic structural diagram of a user terminal 400 according to an embodiment of this application. The user terminal 400 includes a processor 410, a memory 420, and a transceiver 430. The processor 410, the memory 420, and the transceiver 430 are connected to each other via a bus 440. The memory 420 stores an instruction or a program, and the processor 410 is configured to execute the instruction or the program that is stored in the memory 420. When the instruction or the program that is stored in the memory 420 is executed, the processor 410 is configured to perform an operation performed by the processing module 320 in the foregoing embodiment, and the transceiver 430 is configured to perform an operation performed by the transceiver module 310 in the foregoing embodiment.

It should be noted that the user terminal 300 or the user terminal 400 in the embodiments of this application may correspond to the user terminal in the method embodiments provided in this application, and operations and/or functions of the modules in the user terminal 300 or the user terminal 400 are separately used to implement corresponding procedures of the methods in FIG. 5. For brevity, details are not described herein again.

Figure 12:
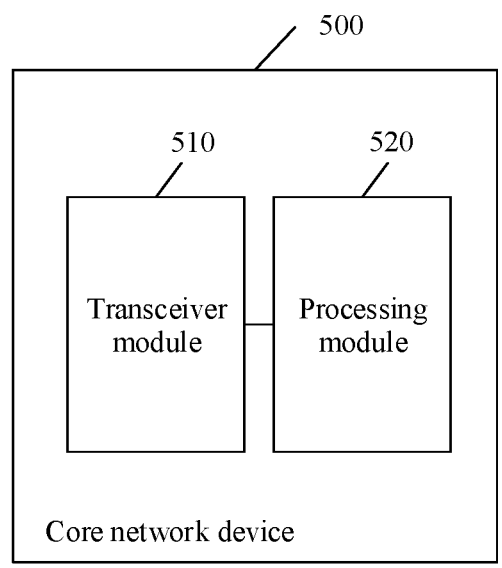
FIG. 12 is a schematic structural diagram of a core network device according to an embodiment of this application.

FIG. 12 is a schematic structural diagram of a core network device 500 according to an embodiment of this application. The core network device 500 includes at least a transceiver module 510 and a processing module 520.

The transceiver module 510 is configured to receive a plurality of first messages sent by an access network device, where each of the first messages includes a subset of a UE capability information set.

The processing module 520 is configured to store the plurality of first messages.

In this embodiment of this application, after receiving a plurality of response messages sent by a user terminal, the access network device stores UE capability information included in the plurality of response messages, and sends the UE capability information to the core network device by using a plurality of messages (namely, the first messages). Each of the messages includes the subset of the UE capability information set. The core network device receives the plurality of messages sent by the access network device, and stores the UE capability information included in the plurality of messages. In this way, if subsequently needing to use the UE capability information, the access network device may directly obtain the UE capability information from the core network device, and the user terminal does not need to report the UE capability information, thereby saving an air interface resource and improving efficiency of obtaining the UE capability information.

In an embodiment, the first message includes at least one of the following:
- first identification information, where the first identification information is used to identify a sequence number of the first message; or first indication information, where the first indication information is used to indicate whether the access network device has completed report of the UE capability information set.

It may be understood that the transceiver module 510 in this embodiment of this application may be implemented by a transceiver or a transceiver-related circuit component, and the processing module 520 may be implemented by a processor or a processor-related circuit component.

Figure 13:
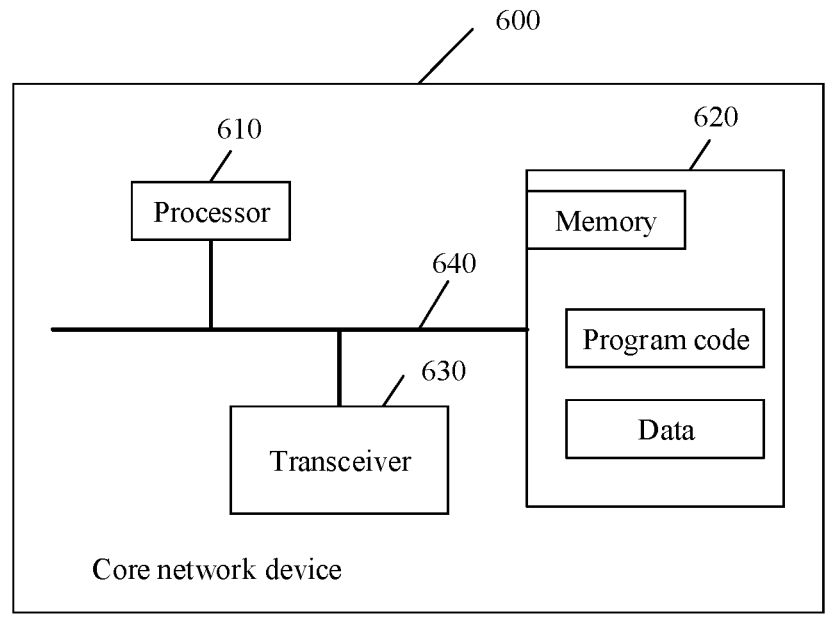
FIG. 13 is a schematic structural diagram of another core network device according to an embodiment of this application.

FIG. 13 is a schematic structural diagram of a core network device 600 according to an embodiment of this application. The core network device 600 includes a processor 610, a memory 620, and a transceiver 630. The processor 610, the memory 620, and the transceiver 630 are connected to each other via a bus 640. The memory 620 stores an instruction or a program, and the processor 610 is configured to execute the instruction or the program that is stored in the memory 620. When the instruction or the program that is stored in the memory 620 is executed, the processor 610 is configured to perform an operation performed by the processing module 520 in the foregoing embodiment, and the transceiver 630 is configured to perform an operation performed by the transceiver module 510 in the foregoing embodiment.

It should be noted that the core network device 500 or the core network device 600 in the embodiments of this application may correspond to the core network device in the method embodiments provided in this application, and operations and/or functions of the modules in the core network device 500 or the core network device 600 are separately used to implement corresponding procedures of the methods in FIG. 5. For brevity, details are not described herein again.

An embodiment of this application further provides a communications apparatus, and the communications apparatus may be a user terminal device or a circuit. The communications apparatus may be configured to perform an action performed by the user terminal in the foregoing method embodiments.

Figure 14:
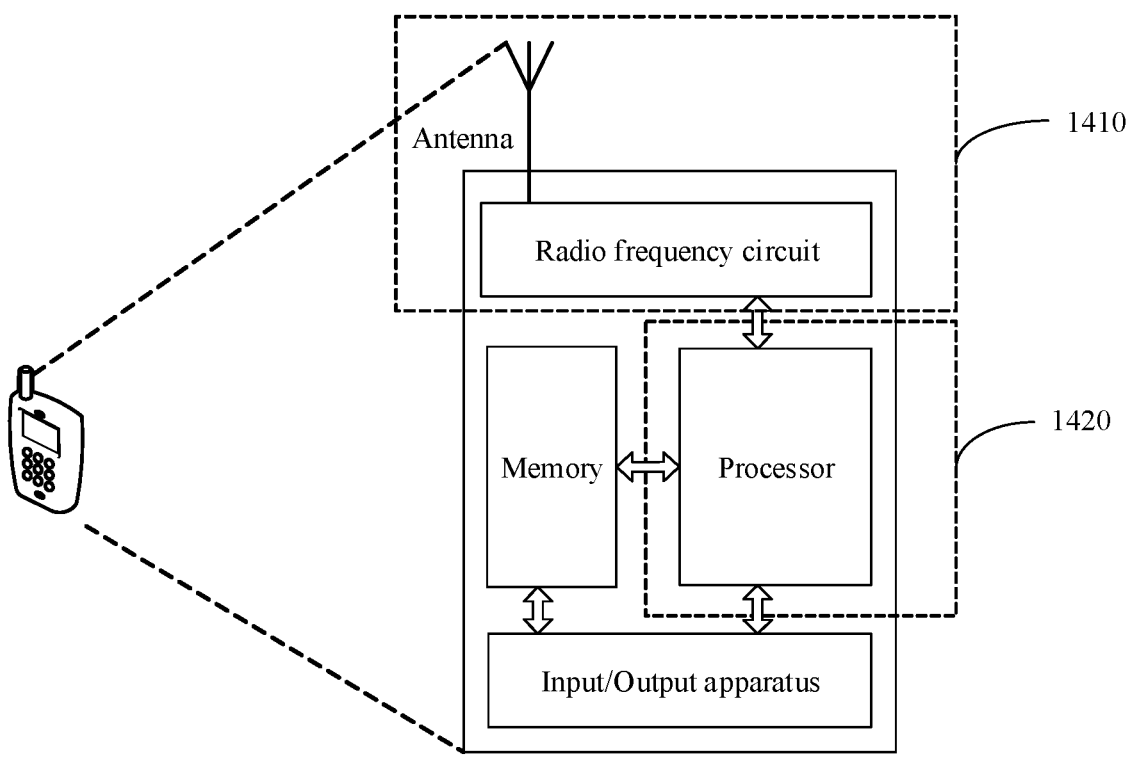
FIG. 14 is a schematic block diagram of a communications apparatus according to an embodiment of this application.

When the communications apparatus is a user terminal, FIG. 14 is a simplified schematic structural diagram of a user terminal. For ease of understanding and illustration, a smartphone is used as an example of the user terminal in FIG. 14. As shown in FIG. 14, the user terminal includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in an electromagnetic wave form. The input/output apparatus, such as a touchscreen, a display, or a keyboard, is mainly configured to: receive data entered by a user, and output data to the user. It should be noted that some types of user terminals may not have an input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in the electromagnetic wave form via the antenna. When data is sent to the terminal device, the radio frequency circuit receives a radio frequency signal via the antenna, converts the radio frequency signal into a baseband signal, and outputs the baseband signal to the processor. The processor converts the baseband signal into data, and processes the data. For ease of description, FIG. 14 shows only one memory and one processor. In an actual user terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna having a transceiver function and the radio frequency circuit may be considered as a transceiver unit of the user terminal, and the processor having a processing function may be considered as a processing unit of the user terminal. As shown in FIG. 14, the user terminal includes a transceiver unit 1410 and a processing unit 1420. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit may also be sometimes referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like.

It should be understood that the transceiver unit 1410 is configured to perform the sending operation and the receiving operation on a user terminal side in the foregoing method embodiments, and the processing unit 1420 is configured to perform an operation other than the receiving/sending operation of the user terminal in the foregoing method embodiments.

For example, in an implementation, the transceiver unit 1410 is configured to perform the sending operation on the user terminal side in step S502 in FIG. 5, and/or the transceiver unit 1410 is further configured to perform another receiving/sending step on the user terminal side in the embodiments of this application. The processing unit 1420 is configured to perform an operation of generating the plurality of first response messages in step S502 in FIG. 5, and/or the processing unit 1420 is further configured to perform another processing step on the user terminal side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 15:
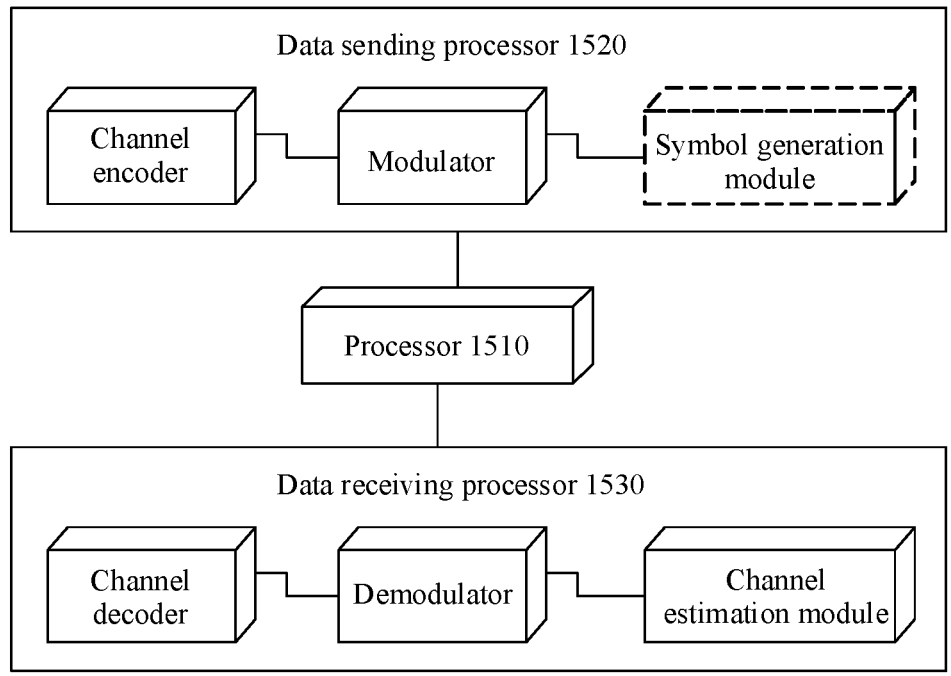
FIG. 15 is another schematic block diagram of a communications apparatus according to an embodiment of this application.

When the communications apparatus in this embodiment is a user terminal, refer to a device shown in FIG. 15. In an example, the device can implement a function similar to a function of the processor 410 in FIG. 11. In FIG. 15, the device includes a processor 1510, a data sending processor 1520, and a data receiving processor 1530. The processing module 320 in the foregoing embodiment may be the processor 1510 in FIG. 15, and completes a corresponding function. The transceiver module 310 in the foregoing embodiment may be the data sending processor 1520 and/or the data receiving processor 1530 in FIG. 15. Although FIG. 15 shows a channel encoder and a channel decoder, it may be understood that these modules are merely examples, and do not constitute limitative descriptions of this embodiment.

Figure 16:
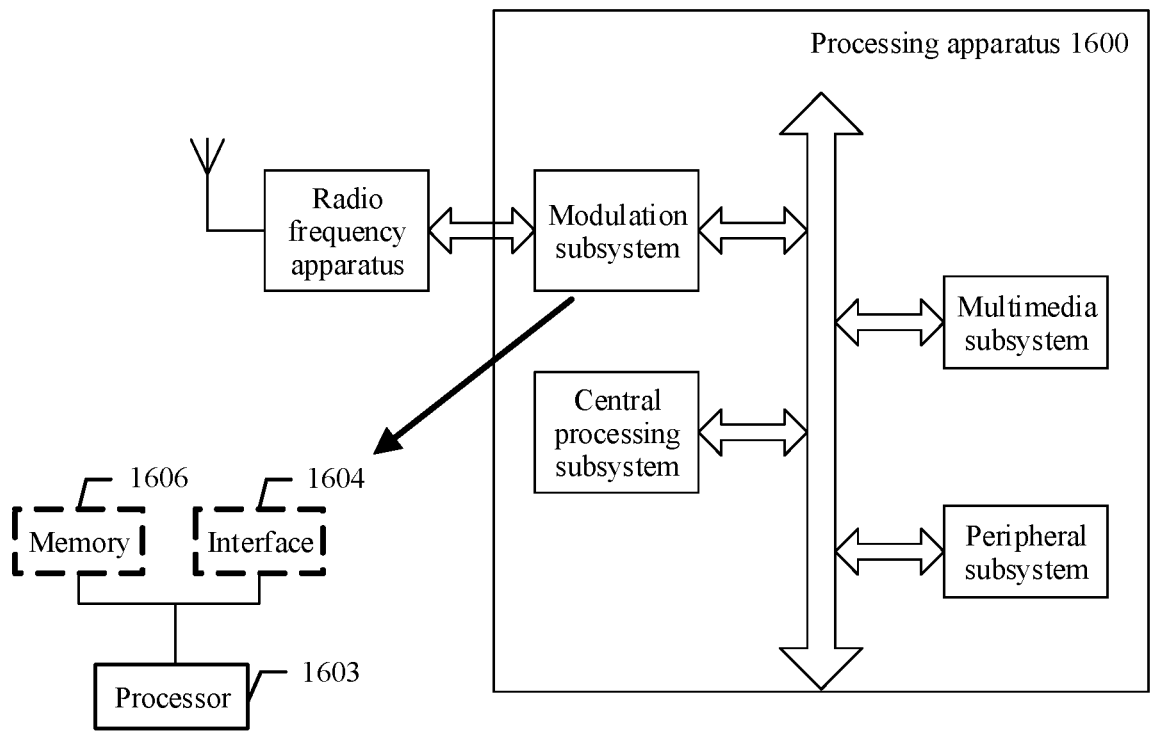
FIG. 16 is still another schematic block diagram of a communications apparatus according to an embodiment of this application.

FIG. 16 shows another form of this embodiment. A processing apparatus 1600 includes modules such as a modulation subsystem, a central processing subsystem, and a peripheral subsystem. The communications apparatus in this embodiment may be used as the modulation subsystem in the processing apparatus 1600. Specifically, the modulation subsystem may include a processor 1603 and an interface 1604. The processor 1603 implements a function of the processing module 320, and the interface 1604 implements a function of the transceiver module 310. In another variation, the modulation subsystem includes a memory 1606, a processor 1603, and a program that is stored in the memory 1606 and that can be run on the processor. When executing the program, the processor 1603 implements the method on the user terminal side in the foregoing method embodiments. It should be noted that the memory 1606 may be nonvolatile or volatile. The memory 1606 may be located in the modulation subsystem, or may be located in the processing apparatus 1600, provided that the memory 1606 can be connected to the processor 1603.

An embodiment of this application further provides a computer-readable storage medium. The computer-readable storage medium stores a computer program. When the program is executed by a processor, a procedure related to an access network device in the method for transmitting user terminal capability information provided in the foregoing method embodiments may be implemented.

An embodiment of this application further provides a computer-readable storage medium. The computer-readable storage medium stores a computer program. When the program is executed by a processor, a procedure related to a user terminal in the method for transmitting user terminal capability information provided in the foregoing method embodiments may be implemented.

An embodiment of this application further provides a computer-readable storage medium. The computer-readable storage medium stores a computer program. When the program is executed by a processor, a procedure related to a core network device in the method for transmitting user terminal capability information provided in the foregoing method embodiments may be implemented.

An embodiment of this application further provides a computer program product. When the computer program product is run on a computer or a processor, the computer or the processor is enabled to perform one or more steps in any one of the foregoing methods for transmitting user terminal capability information. When the foregoing modules in the device are implemented in a form of a software functional unit and sold or used as an independent product, the modules may be stored in a computer-readable storage medium.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should further be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

A sequence of the steps of the method in the embodiments of this application may be adjusted, combined, or deleted based on an actual requirement.

The modules in the apparatus in the embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions set forth in the foregoing embodiments or make equivalent replacements to some technical features thereof, without making the essence of the corresponding technical solutions depart from the scope of the technical solutions of the embodiments of this application.

What is claimed is:

1. A communication method, comprising:
    sending a capability information enquiry message to a terminal device;
    receiving a plurality of radio resource control (RRC) message segments from the terminal device in response to the capability information enquiry message, wherein each of the plurality of RRC message segments comprises a segment of capability information, and the segment of the capability information is obtained by splitting the capability information based on a default size; and
    wherein the capability information enquiry message comprises an indication identifier indicating that RRC message segmentation is allowed for the capability information.

2. The method according to claim 1, wherein the capability information comprises at least one of the following:
    a band combination, a feature set, or a non-carrier aggregation capability that are supported by the terminal device.

3. The method according to claim 1, wherein a last received RRC message segment comprises indication information, and wherein the indication information indicates that a report of the capability information has been completed.

4. The method according to claim 1, wherein after the receiving a plurality of RRC message segments from the terminal device, the method further comprises:
    sending a plurality of first messages to a core network device, wherein each of the first messages comprises a segment of the capability information.

5. The method according to claim 4, wherein
    a first message of the plurality of first messages comprises a first indication information to identify whether the first message is a last message.

6. The method according to claim 1, wherein the default size is a maximum size of a packet data convergence protocol (PDCP) payload.

7. The method according to claim 1, wherein the method further comprises:
    receiving third indication information from the terminal device, wherein the third indication information indicates that the terminal device supports sending the capability information by using a plurality of RRC message segments.

8. The method according to claim 7, wherein the third indication information is comprised in an RRC connection setup complete message.

9. A communication method, applied for a terminal device or a chip of the terminal device, the method comprising:
    receiving a capability information enquiry message from an access network device; and
    sending a plurality of radio resource control (RRC) message segments to the access network device in response to the capability information enquiry message, wherein each of the plurality of RRC message segments comprises a segment of capability information, and the segment of the capability information is obtained by splitting the capability information based on a default size; and
    wherein the capability information enquiry message comprises an indication identifier indicating that RRC message segmentation is allowed for the capability information.

10. The method according to claim 9, wherein the capability information comprises at least one of the following:
    a band combination, a feature set, or a non-carrier aggregation capability that are supported by the terminal device.

11. The method according to claim 9, wherein a last sent RRC message segment comprises indication information, and wherein the indication information indicates that a report of the capability information has been completed.

12. The method according to claim 9, wherein the default size is a maximum size of a packet data convergence protocol (PDCP) payload.

13. The method according to claim 9, wherein the method further comprises:
sending third indication information to the access network device, wherein the third indication information indicates that the terminal device supports sending the capability information by using a plurality of RRC message segments.

14. The method according to claim 13, wherein the third indication information is comprised in an RRC connection setup complete message.

15. An apparatus, wherein the apparatus is an access network device or a chip of the access network device, and the apparatus comprises:
one or more processors; and
one or more memories coupled to the one or more processors and storing programming instructions for execution by the one or more processors to cause the apparatus to perform a method comprising:
sending a capability information enquiry message to a terminal device;
receiving a plurality of radio resource control (RRC) message segments from the terminal device in response to the capability information enquiry message, wherein each of the plurality of RRC message segments comprises a segment of capability information, and the segment of the capability information is obtained by splitting the capability information based on a default size; and
wherein the capability information enquiry message comprises an indication identifier indicating that RRC message segmentation is allowed for the capability information.

16. The apparatus according to claim 15, wherein the capability information comprises at least one of the following:
a band combination, a feature set, or a non-carrier aggregation capability that are supported by the terminal device.

17. The apparatus according to claim 15, wherein a last received RRC message segment comprises indication information, and wherein the indication information indicates that a report of the capability information has been completed.

18. The apparatus according to claim 15, wherein after the receiving a plurality of RRC message segments from the terminal device, the apparatus is further caused to perform:
sending a plurality of first messages to a core network device, wherein each of the first messages comprises a segment of the capability information.

19. The apparatus according to claim 18, wherein
a first message of the plurality of first messages comprises a first indication information to identify whether the first message is a last message.

20. The apparatus according to claim 15, wherein the default size is a maximum size of a packet data convergence protocol (PDCP) payload.

21. The apparatus according to claim 15, wherein the method further comprises:
receiving third indication information from the terminal device, wherein the third indication information indicates that the terminal device supports sending the capability information by using a plurality of RRC message segments.

22. The apparatus according to claim 21, wherein the third indication information is comprised in an RRC connection setup complete message.

23. An apparatus, wherein the apparatus is a terminal device or a chip of the terminal device, and the apparatus comprises:
one or more processors; and
one or more memories coupled to the one or more processors and storing programming instructions for execution by the one or more processors to cause the apparatus to perform a method comprising:
receiving a capability information enquiry message from an access network device; and
sending a plurality of radio resource control (RRC) message segments to the access network device in response to the capability information enquiry message, wherein each of the plurality of RRC message segments comprises a segment of capability information, and the segment of the capability information is obtained by splitting the capability information based on a default size; and
wherein the capability information enquiry message comprises an indication identifier indicating that RRC message segmentation is allowed for the capability information.

24. The apparatus according to claim 23, wherein the capability information comprises at least one of the following:
a band combination, a feature set, or a non-carrier aggregation capability that are supported by the terminal device.

25. The apparatus according to claim 23, wherein a last sent RRC message segment comprises indication information, and wherein the indication information indicates that a report of the capability information has been completed.

26. The apparatus according to claim 23, wherein the default size is a maximum size of a packet data convergence protocol (PDCP) payload.

27. The apparatus according to claim 23, wherein the method further comprises:
sending third indication information to the access network device, wherein the third indication information indicates that the apparatus supports sending the capability information by using a plurality of RRC message segments.

28. The apparatus according to claim 27, wherein the third indication information is comprised in an RRC connection setup complete message.

* * * * *